(12) United States Patent
Kolpak et al.

(10) Patent No.: US 10,703,628 B2
(45) Date of Patent: Jul. 7, 2020

(54) NANO-TEMPLATED ENERGY STORAGE MATERIALS

(75) Inventors: Alexie M. Kolpak, Boston, MA (US); Jeffrey C. Grossman, Brookline, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 88 days.

(21) Appl. No.: 13/457,448

(22) Filed: Apr. 26, 2012

(65) Prior Publication Data

US 2012/0325200 A1 Dec. 27, 2012

Related U.S. Application Data

(60) Provisional application No. 61/500,644, filed on Jun. 24, 2011.

(51) Int. Cl.
| | |
|---|---|
| *B82Y 30/00* | (2011.01) |
| *C09K 5/08* | (2006.01) |
| *F28D 20/00* | (2006.01) |
| *F24S 60/00* | (2018.01) |
| *F24S 60/20* | (2018.01) |

(52) U.S. Cl.
CPC .............. *B82Y 30/00* (2013.01); *C09K 5/08* (2013.01); *F24S 60/00* (2018.05); *F24S 60/20* (2018.05); *F28D 20/00* (2013.01); *F28F 2255/20* (2013.01); *Y02E 10/40* (2013.01); *Y02E 60/142* (2013.01); *Y02E 70/30* (2013.01)

(58) Field of Classification Search
CPC ................................ B82Y 30/00; F24S 60/20
See application file for complete search history.

(56) References Cited

PUBLICATIONS

Sadowska et al. "Synthesis, characterization, and electrochemical testing of carbon nanotubes derivatized with azobenzene and anthraquinone" Carbon, 2009, vol. 47, pp. 1501-1510.*
Senadeera et al. "Synthesis of Triphenylamine Trisazo Dye and Study of its Uses in Dye Sensitized Solar Cells" Sri Lankan Journal of Physics, 2005, vol. 6, pp. 43-50.*
Ying et al. "Functionalization of Carbon Nanotubes by Free Radicals" Organic Letters, 2003, vol. 5, pp. 1471-1473.*
Kucharski et al. "Templated assembly of photoswitches significantly increases the energy-storage capacity of solar thermal fuels" Nature Chemistry, 2014, vol. 6, pp. 441-447.*

Alexie M. Kolpak et al., "Azobenzene-Functionalized Carbon Nanotubes as High-Energy Density Solar Thermal Fuels," Nano Letters, vol. 11, No. 8, Jun. 20, 2011, pp. 3156-3162.
K. Sadowska et al., "Synthesis, characterization, and electrochemical testing of carbon nanotubes derivatized with azobenzene and anthraquinone," Carbon, vol. 47, No. 6, May 1, 2009, pp. 1501-1510.
Feng Yiyu, et al., "Photoinduced anisotropic response of azobenzene chromophore functionalized multiwalled carbon nanotubes," Journal of Applied Physics, vol. 102, No. 5, Sep. 7, 2007, pp. 53102-53102.
Xuefeng Guo et al., "Directing and Sensing Changes in Molecular Conformation on Individual Carbon Nanotube Field Effect Transistors," Journal of the American Chemical Society, vol. 127, No. 43, Nov. 1, 2005, pp. 15045-15047.
Elisa del Canto et al., "Functionalization of single-walled carbon nanotubes with optically switchable spiropyrans," Carbon, vol. 48, No. 10, Aug. 1, 2010, pp. 2815-2824.
Ipsita A. Banerjee et al., "Application of Host-Guest Chemistry in Nanotube-Based Device Fabrication: Photochemically Controlled Immobilization of Azobenzene Nanotubes on Patterned α-CD Monolayer/Au Substrates via Molecular Recognition," Journal of the American Chemical Society, vol. 125, No. 32, Aug. 1, 2003, pp. 9542-9543.
International Search Report and Written Opinion dated Sep. 5, 2012; International Application No. PCT/US2012/035379.
Feng, W. et al., J. Mater. Chem. A, 4, 8020 (2016).
Feng, W. et al., Sci. Reports, 3, 3260 (2013).
Luo W. et al, J. Mater. Chem. A, 3, 11787 (2015).
Han, G.D., et al, J. Mater. Chem. A, 4, 16157 (2016).
Zhitomirsky, D. et al, ACS Appl. Mater. Interfaces, 8, 201319-26325 (2016).
Zhitomirsky, D. et al, Adv. Energy Mater. 1502006 (2015).
"Photon Energy Storage Materials with High Energy Densities Based on Diacetylene-Azobenzene Derivatives," GD Han, SS Park, Y Liu, D Zhitomirsky, E Cho, M Dinca, JC Grossman, J. Mater. Chem. A, 2016, Advance Article.
"Conformal Electroplating of Azobenzene-Based Solar Thermal Fuels onto Large Area and Fiber Geometries," David Zhitomirsky, Jeffrey C Grossman, ACS Appl. Mater. Interfaces, 2016, 8 (39), pp. 26319-26325.
"Solid-State Solar Thermal Fuels for Heat Release Applications," D Zhitomirsky, E Cho, JC Grossman, Advanced Energy Materials (2015).
"Templated Assembly of Photoswitches Significantly Increases the Energy-Storage Capacity of Solar Thermal Fuels," Timothy J. Kucharski, Nicola Ferralis, Alexie M. Kolpak, Jennie O. Zheng, Daniel G. Nocera and Jeffrey C. Grossman Nature Chemistry (2014).

* cited by examiner

*Primary Examiner* — Joseph R Kosack
(74) *Attorney, Agent, or Firm* — Steptoe & Johnson LLP

(57) ABSTRACT

A solar thermal fuel can include a plurality of photoswitchable moieties associated with a nanomaterial. The plurality of photoswitchable moieties can be densely arranged on the nanomaterial, such that adjacent photoswitchable moieties interact with one another. The solar thermal fuel can provide high volumetric energy density.

8 Claims, 15 Drawing Sheets all-trans state    all-cis state $\Delta H = -1.25$ eV/azo $\Delta H = -0.91$ eV/azo all-trans state    all-cis state Phenyl linker imposes more rigidity → more order → higher DH

NANO-TEMPLATED ENERGY STORAGE MATERIALS

CLAIM OF PRIORITY

This application claims priority to provisional U.S. application No. 61/500,644, filed Jun. 24, 2011, which is incorporated by reference in its entirety.

TECHNICAL FIELD

This invention relates to nano-templated energy storage materials, particularly solar thermal fuels, and methods of making and using them.

BACKGROUND

The development of new energy technologies that are simultaneously economically viable, clean, sustainable, and easily transportable has become one of the most important research goals of the 21st century. Full utilization of the largest and most obvious source of renewable energy—the sun—requires advanced technologies for converting light into other useful forms of energy, as well as novel means for storing energy for convenient transport and on-demand use. One promising concept that has recently become the focus of renewed attention is that of solar thermal fuels, which store energy from the sun in photoactive molecules. Upon absorption of light energy, a photoactive molecule adopts a higher-energy metastable state. To release the energy stored in the higher-energy state, an external trigger (such as heat, light, voltage, or a chemical reaction) is applied). The fuel can subsequently be recharged by exposure to light; in principle, the entire operation can be repeated ad infinitum.

SUMMARY

Solar thermal fuels provide advantages including renewability, absence of emissions, and is easy transportation in the form of a liquid or powder. Solar thermal fuels based on a photoswitchable moiety associated with a nanomaterial template can offer certain advantages over fuels based on non-templated photoswitchable materials. The nanomaterial template can provide ordered and closely spaced sites for photoswitchable moieties to anchor, so that a large number of photoswitchable moieties can be provided in a small volume, resulting in increased energy density. Solar thermal fuels based on diazobenzene photoswitchable moieties and carbon nanotubes can have volumetric energy densities comparable to or greater than those of state of the art Li-ion batteries.

In one aspect, an energy storage device includes a solar thermal fuel including a plurality of photoswitchable moieties associated with a nanomaterial.

The plurality of photoswitchable moieties can be arranged in a repeating pattern on the nanomaterial. Adjacent photoswitchable moieties can interact with one another. The interactions between adjacent photoswitchable moieties can include pi-pi interactions, van der Waals interactions, hydrophobic effects, steric interactions, hydrogen bonds, disulfide bonds, or a combination thereof. The plurality of photoswitchable moieties can be covalently linked to the nanomaterial.

The nanomaterial can include a polyaromatic hydrocarbon, a graphite, a graphene, a conjugated alkene chain, a fullerene, a carbon nanotube, a beta-carotene, a porphyrin, a sugar-phosphate chain, a boron nitride nanotube, a boron nitride nanosheet, a transition metal dichalcogenide nanotube, a transition metal dichalcogenide nanoparticle, a transition metal dichalcogenide nanowire, or a transition metal dichalcogenide nanosheet, a transition metal dichalcogenide molecular chain, a group IV semiconductor nanowire, a group IV semiconductor nanoparticle, a group II-VI semiconductor nanowire, a group II-VI semiconductor nanoparticle, a group III-V semiconductor nanowire, a group III-V semiconductor nanoparticle, a transition metal oxide nanowire, or a transition metal oxide nanoparticle.

The carbon nanotube can be a single walled carbon nanotube. The plurality of photoswitchable moieties can include a plurality of diazobenzene moieties, a plurality of stilbene moieties, a plurality of norbornadiene moieties, or a plurality of spiropyran moieties.

The plurality of diazobenzene moieties can have formula (I):

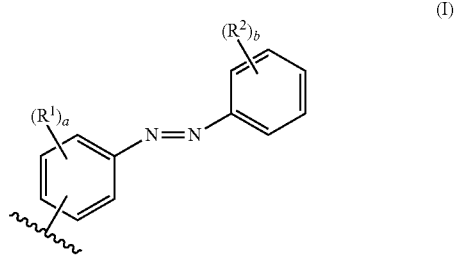

where:

each $R^1$, independently, can be H, halo, hydroxy, nitro, cyano, amino, alkylamino, dialkylamino, —$SO_3H$, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

each $R^2$, independently, can be H, halo, hydroxy, nitro, cyano, amino, alkylamino, dialkylamino, —$SO_3H$, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

a can be 0, 1, 2, 3 or 4;

b can be 0, 1, 2, 3, 4, or 5; and

⊢— can represent an optional covalent link to the nanomaterial.

In another aspect, an energy storage device includes a solar thermal fuel including a plurality of diazobenzene moieties covalently linked to a carbon nanotube, wherein the plurality of diazobenzene moieties are arranged in a repeating pattern on the carbon nanotube such that adjacent diazobenzene moieties interact with one another via pi-pi interactions, van der Waals interactions, hydrophobic effects, steric interactions, hydrogen bonds, disulfide bonds, or a combination thereof.

In another aspect, a method of storing energy includes providing an energy storage device comprising a solar thermal fuel including a plurality of photoswitchable moieties associated with a nanomaterial; illuminating the plurality of photoswitchable moieties, thereby converting the photoswitchable moieties to from a lower-energy state to a higher-energy metastable state; storing the plurality of photoswitchable moieties in the higher-energy metastable state for a period of time; and providing a trigger to cause the plurality of photoswitchable moieties to revert to the lower-energy state.

The plurality of photoswitchable moieties can be arranged in a repeating pattern on the nanomaterial. Adjacent photoswitchable moieties can interact with one another. The interactions between adjacent photoswitchable moieties can include pi-pi interactions, van der Waals interactions, hydrophobic effects, steric interactions, hydrogen bonds, disulfide bonds, or a combination thereof.

The plurality of photoswitchable moieties can be covalently linked to the nanomaterial. The nanomaterial can include a polyaromatic hydrocarbon, a graphite, a graphene, a conjugated alkene chain, a fullerene, a carbon nanotube, a beta-carotene, a porphyrin, a sugar-phosphate chain, a boron nitride nanotube, a boron nitride nanosheet, a transition metal dichalcogenide nanotube, a transition metal dichalcogenide nanoparticle, a transition metal dichalcogenide nanowire, or a transition metal dichalcogenide nanosheet, a transition metal dichalcogenide molecular chain, a group IV semiconductor nanowire, a group IV semiconductor nanoparticle, a group II-VI semiconductor nanowire, a group II-VI semiconductor nanoparticle, a group III-V semiconductor nanowire, a group III-V semiconductor nanoparticle, a transition metal oxide nanowire, or a transition metal oxide nanoparticle.

The carbon nanotube can be a single walled carbon nanotube. The plurality of photoswitchable moieties can include a plurality of diazobenzene moieties, a plurality of stilbene moieties, a plurality of norbornadiene moieties, or a plurality of spiropyran moieties. The plurality of diazobenzene moieties can have formula (I):

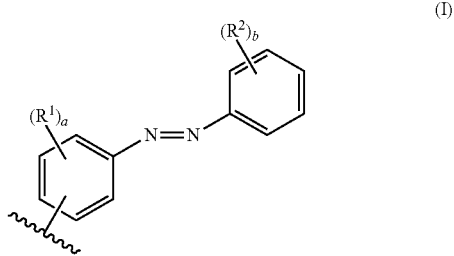
(I)

where:

each $R^1$, independently, can be H, halo, hydroxy, nitro, cyano, amino, alkylamino, dialkylamino, —SO$_3$H, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

each $R^2$, independently, can be H, halo, hydroxy, nitro, cyano, amino, alkylamino, dialkylamino, —SO$_3$H, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

a can be 0, 1, 2, 3 or 4;

b can be 0, 1, 2, 3, 4, or 5; and

⊣ can represent an optional covalent link to the nanomaterial.

Other aspects, embodiments, and features will be apparent from the following description, the drawings, and the claims.

BRIEF DESCRIPTION OF THE DRAWINGS

In FIG. 1b, 2,2',5'-trihydroxy diazobenzene molecules covalently attached to a CNT undergo a photoinduced trans-to-cis isomerization, storing ΔH=1.55 eV per azobenzene. A thermal barrier, $E_a$, prevents the back reaction from occurring under storage conditions; an external trigger controls the release of the stored energy. The inset shows the corresponding parameters for untethered azobenzene molecules.

FIG. 2a is a side view of a row of cis-2,2'-dihydroxy-diazobenzene molecules covalently bound to an (8,0) CNT via amide linkers at the para position, showing the optimal ground state packing density parallel to the nanotube axis (one azobenze molecule per 4 CNT carbon atoms). For clarity, the system has only a single azobenzene in the direction perpendicular to the nanotube long axis. Dashed lines indicate H-bonds. FIG. 2b shows ΔH, $E_a$, and total energies of the cis (circles) and trans (squares) isomers of unsubstituted azobenzene as a function of intermolecular spacing. FIG. 2c shows phenyl (φ) and C—N=N (θ) angles vs intermolecular spacing. All values in (b,c) are given with respect to the computed values for an isolated azobenzene molecule.

DETAILED DESCRIPTION

In general, a solar thermal fuel stores light energy in the form of chemical bonds and subsequently releases that energy for practical work. This process is illustrated schematically in FIGS. 1a and 1b: upon absorption of light with energy hv, a photoactive "fuel" molecule undergoes a conformational change or reaction to a higher energy metastable state, thus storing energy ΔH. An external trigger (e.g., heat, light, voltage, or a chemical reaction) is applied, providing energy to overcome the thermal barrier, $E_a$, and releasing a net energy of ΔH per molecule.

A solar thermal fuel can include photoswitchable moieties combined with a nanomaterial. The nanomaterial can provide a scaffold to arrange the photoswitchable moieties; in some cases, the arrangement allows photoswitchable moieties to interact with one another. The scaffold can also provide a dense arrangement of photoswitchable moieties, such that the solar thermal fuel can have increased energy storage capacity. The solar thermal fuel can also have increased thermal stability of the photoswitch molecules.

Figure 1A:
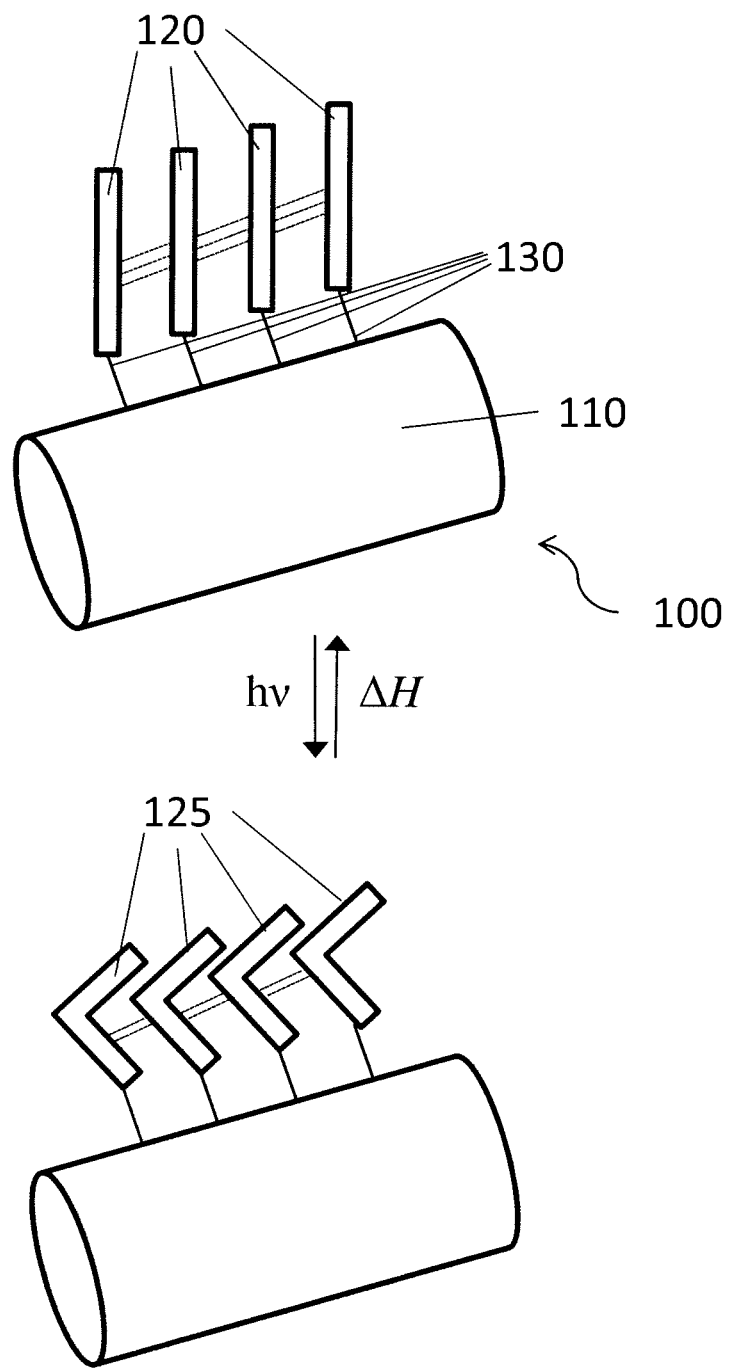
FIG. 1a is a schematic illustration of a solar thermal fuel.

Referring to FIG. 1a, solar thermal fuel 100 includes nanomaterial 110. Nanomaterial 110 is associated with a photoswitchable moieties 120 via associations 130. Associations 130 can include covalent links (which can include, for example, a disulfide bond) or noncovalent associations involving, e.g., van der Waals forces, pi-pi interactions, hydrophobic interactions, steric interactions, hydrogen bonds, or electrostatic interactions. As illustrated schematically in FIG. 1a, photoswitchable moieties 120 are densely arranged on nanomaterial 110, such that one photoswitchable moiety 120 can interact with an adjacent photoswitchable moiety 120 (interactions between photoswitchable moieties 120 shown as dashed lines). The arrangement of photoswitchable moieties 120 on nanomaterial 110 can be in a regular, repeating pattern, such that many photoswitchable moieties 120 can consecutively interact with their adjacent neighbors. The regular, repeating pattern of photoswitchable moieties 120 can be determined by the structure of the nanomaterial, the structure of the association, the structure of the photoswitchable moieties, or a combination of these and other factors. For example, when nanomaterial 110 is a carbon nanotube, the regular, repeating pattern of photoswitchable moieties 120 can be determined by a regular, repeating pattern of carbon atoms in the nanotube framework; here the structure of the nanomaterial determines the pattern. In another example, nanomaterial 110 is a gold nanoparticle and association 130 includes an alkylthiol chain covalently linking the photoswitchable moieties 120 to the nanomaterial. In this case, the regular repeating pattern can be determined by the size of the gold nanoparticles, and the structure (e.g., length and steric bulk) of the alkyl chains in the linker. The pattern can be selected so as to produce interactions between adjacent photoswitchable moieties 120, to provide solar thermal fuel 100 with desirable energetic properties, described below.

When illuminated with light hv of an appropriate frequency, photoswitchable moieties 120 are converted to an energy-storing form 125 of the photoswitchable moieties. The conversion to energy-storing form 125 typically involves a conformational change or the forming or breaking of covalent bonds. Energy-storing form 125 remains associated with nanomaterial 110. Interactions between adjacent ones maybe stronger, weaker, or of a different nature or configuration than in lower energy form 120. Energy-storing form 125 is desirably metastable, such that the reversion from energy-storing form 125 to lower energy form 120 is controllable, that is, reversion occurs only when a controllable stimulus (e.g., heat, light, voltage, or a chemical reaction) is provided. Reversion from energy-storing form 125 to lower energy form 120 releases energy, typically in the form of heat, which can be captured to provide useful work.

A number of photoisomerization reactions, in particular conversion between norbornadiene and quadricyclane, and between anthracene and dianthracene, were investigated extensively for use in solar thermal fuels in the 1970's and 80's. While storage and retrieval of solar energy in these molecules was demonstrated experimentally, the concept of solar thermal fuels was generally dismissed as being practically unfeasible, primarily due to the degradation of the fuel such that it could not be resused after only a few cycles of energy conversion and release. See, e.g., Phillippopoulos, C.; et al., J. Ind. Eng. Chem. Prod. Res. Dev. 1983, 22, 627-33, which is incorporated by reference in its entirety.

A newer solar fuel candidate, tetracarbonyl-diruthenium fulvalene (Ru-fulvalene), that can cycle through this process numerous times-3 without degradation. See, for example, Boese, R.; et al., J. Am. Chem. Soc. 1997, 119, 6757-73, which is incorporated by reference in its entirety. Despite resistance to degradation, Ru-fulvalene is not a practical candidate for large-scale use due to the requirement for ruthenium, a rare and expensive element. To date, efforts to replace the ruthenium with cheaper and more abundant transition metals (e.g., iron) have faced displayed poor thermal stability and/or low energy density. In addition, while the gravimetric energy density of the Ru-fulvalene fuel is comparable to that of current Li-ion batteries, its volumetric energy density in solution is several orders of magnitude smaller, making portability unfeasible as well as increasing storage costs. See, e.g., Kanai, Y.; et al., Angew. Chem. 2010, 49, 8926-9, which is incorporated by reference in its entirety. Other efforts to increase the energy storage capacity via substitution of functional groups in several photoisomerizations have lead only to small (~10-20%) increases in ΔH, and often in an undesired decrease of $E_a$.

Azobenzenes are another well studied class of photoswitchable moities. See, e.g., Halabieh, R. H. E.; et al., Pure Appl. Chem. 2004, 76, 1445-65, which is incorporated by reference in its entirety. Additional photoswitchable moieties include stilbene, norbornadiene-quadricyclane, and spiropyran-merocyanine.

Nanomaterial scaffolds preferably have properties including rigidity; ordered and closely spaced sites for PSMs to attach or adsorb on the scaffold; the ability to covalently link to PSMs; high solubility; transparency to UV/vis light; low mass and/or volume; low thermal conductivity; and low cost. Nanomaterials suitable as scaffolds include, but are not limited to carbon-based materials such as polyaromatic hydrocarbons (e.g., pentacene); graphite; graphene; conjugated alkene chains (e.g., polyacetylenes); fullerenes; and carbon nanotubes (including multiwall and single-wall carbon nanotubes). Additional examples of nanomaterial scaffolds include a beta-carotene; a porphyrin; a sugar-phosphate chain (e.g., as found in a nucleic acid); a boron nitride nanotube or nanosheet; a transition metal dichalcogenide (e.g., molybdenum disulfide) nanotube or molecular chain, a nanoparticle, a nanowire, or a nanosheet; a semiconductor (e.g., a group IV, group II-VI, or group III-V) nanowire or nanoparticle; or a transition metal oxide nanowire or nanoparticle.

Carbon nanotubes (CNTs) are a modifiable nanomaterial suitable for acting as a scaffold for a photoswitchable moiety. The photoswitchable moiety (PSM) can be covalently linked to, or adsorbed on, the carbon nanotube. Another nanomaterial including ordered and closely spaced sites for PSMs to attach or adsorb on the scaffold are nucleic acids, in particular double stranded DNA, which can also provide rigidity.

Figure 2:
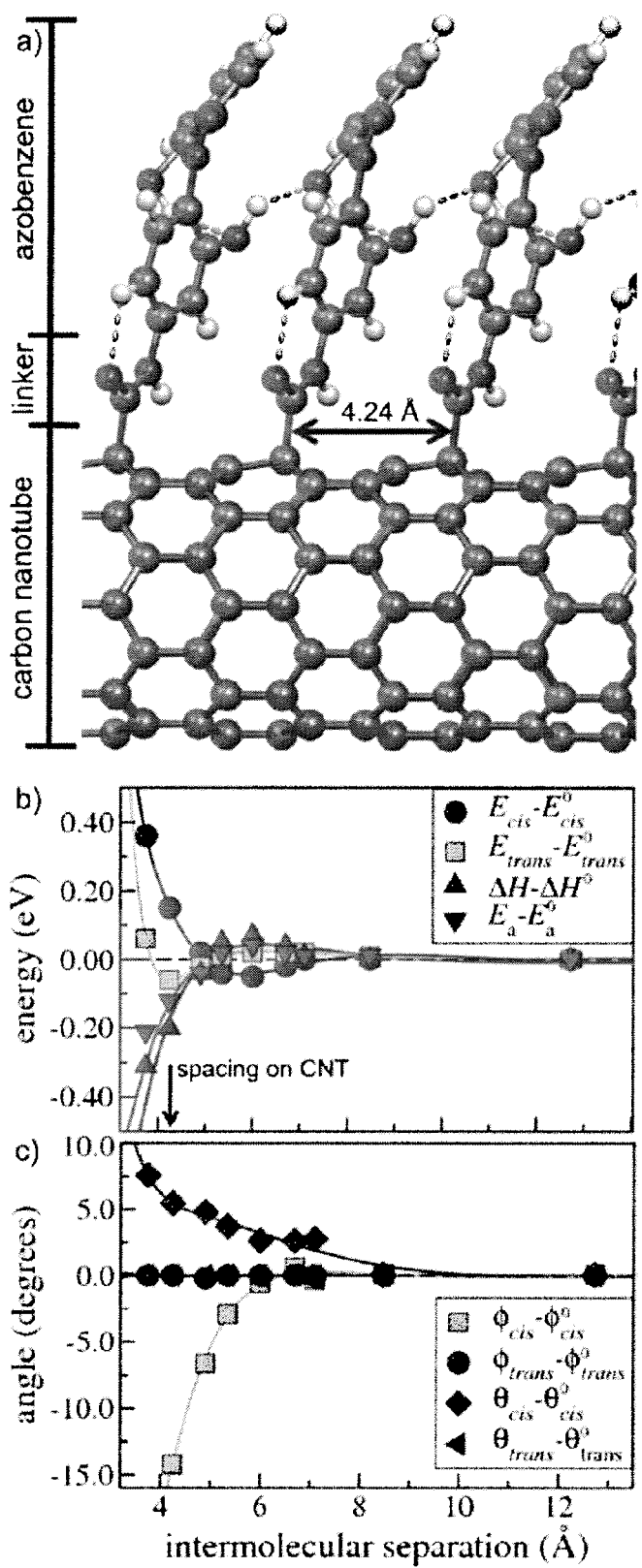

The potential advantages of PSM/CNT hybrid nanostructures as solar thermal fuels stem from the close-packed, ordered array of photoswitchable moieties imposed by the CNT scaffold (see FIG. 2, and Feng, Y.; et al., J. Appl. Phys. 2007, 102, 053102, 1-5, which is incorporated by reference in its entirety). This quasi-crystalline state—which, importantly, persists when the nanostructures are in solution—has two key implications. First, the number of PSM per volume (i.e., photoisomer concentration) is significantly increased with respect to a solution of free photomolecules. For the case of azobenzenes as PSM, depending on the solubility of a given substituted azobenzene species, the PSM/CNT hybrid can have a volumetric energy density of 5-7 orders of magnitude greater than a solution of the free azobenzene. See, e.g., Takagishi, T.; et al., Colloid Polym. Sci. 2007, 232, 693-9, which is incorporated by reference in its entirety. Second, the proximity and the ordered arrangement of the PSM on the scaffold enable systematic manipulation of the inter- and intra-molecular interactions between and within the PSM, providing a highly effective set of tuning parameters for maximizing both the energy storage capacity and the storage lifetime of the solar thermal fuel. Additional tuning parameters include the molecular packing density; the chemistry of the linker group that covalently links the PSM to the CNT; the diameter of the CNT; and the orientation of the PSM—and any functional groups on the PSM—with respect to the CNT.

A set of hybrid nanostructures composed of azobenzene derivatives (collectively referred to as "azo" in the following) covalently bound to CNT substrates have been developed and studied. These are referred to below as azo/CNT structures or the azo/CNT system. Numerous azo compounds are known; see, for example, Zollinger, H., Azo and Diazo Chemistry, Interscience, New York, 1961, which is incorporated by reference in its entirety.

In some embodiments, a photoswitchable diazobenzene moiety can have formula (I):

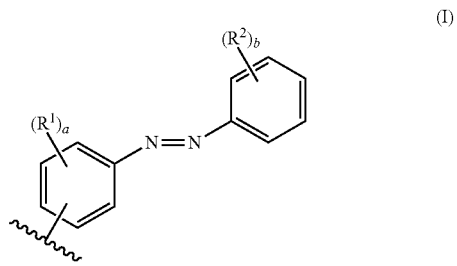

(I)

In formula (I), each $R^1$, independently, can be H, halo, hydroxy, nitro, cyano, amino, alkylamino, dialkylamino, —SO$_3$H, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl.

Each $R^2$, independently, can be H, halo, hydroxy, nitro, cyano, amino, alkylamino, dialkylamino, —SO$_3$H, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

a can be 0, 1, 2, 3 or 4; b is 0, 1, 2, 3, 4, or 5; and $\vert\!-$ can represent an optional covalent link to the nanomaterial.

The azo/CNT structures have several practical advantages as a solar thermal fuel. Azobenzenes have previously been studied for energy storage. See, e.g., Taoda, H.; et al., Chem. Eng. Jpn. 1987, 20, 265-70; and Olmstead, J.; et al., Sol. Energy 1983, 30, 271-4; each of which is incorporated by reference in its entirety. While azo/CNT structures have not been studied for energy storage, they can be experimentally synthesized, and the resulting hybrid nanostructures are observed to have closepacked arrays of covalently attached azobenzene molecules aligned parallel to the long axis of the nanotube. Furthermore, reversible photoinduced switching between the metastable cis and trans isomers of the azobenzene moieties has been experimentally demonstrated. See, for example, Feng, Y.; et al., J. Appl. Phys. 2007, 102, 053102, 1-5; and Simmons, J. M.; et al., Phys. Rev. Lett. 2007, 98, 086802, 1-4; each of which is incorporated by reference in its entirety. Finally, the photoinduced behavior of numerous azobenzene derivatives both in solution and on substrates has been well studied, demonstrating high cyclability and providing a wealth of information to guide the design of an optimal hybrid system. See, for example, Halabieh, R. H. E.; et al., Pure Appl. Chem. 2004, 76, 1445-65; McNellis, E.; et al., Phys. Rev. B 2009, 80, 035414; and Klajn, R. Pure Appl. Chem. 2010, 82, 2247-79; each of which is incorporated by reference in its entirety.

Examples

Density functional theory was used to investigate several new solar thermal fuel candidates based on the azo/CNT system. Dramatic effects on energy density and thermal stability enabled by the presence of the substrate and the crystalline-like azobenzene state were determined. The chemical and geometric interactions that led to this behavior are described. It is possible to obtain azo/CNT solar thermal fuels with volumetric energy densities comparable to or even larger than that of state-of-the-art Li-ion batteries.

Computational Methods

Computations were performed using density functional theory and ultrasoft pseudopotentials within the Quantum Espresso code. We employed the Perdew-Burke-Ernzerhof generalized gradient approximation(PBE-GGA) to exchange and correlation. Simulation supercells included 15 Å of vacuum separating periodic copies in the y- and z-directions. The nanotube long axis was oriented along the x-direction with a periodicity of 4.24 Å or multiples thereof (to determine the behavior with respect to separation distance). Convergence of total energies and electronic properties was achieved for an 8×1×1 Monkhorst-Pack k-point sampling for the smallest simulation cell. To determine the minimum energy structures, several initial positions/orientations of the azo molecules were considered. All atoms were fully relaxed until the force on each was less than 0.01 eV/Å. Nudged elastic band calculations were performed to determine transition pathways and thermal barriers. See Kolpak, A. M., and Grossman, J. C., Nano Lett. 2011, 11, 3156-3162, which is incorporated by reference in its entirety.

Results and Discussion

Figure 3:
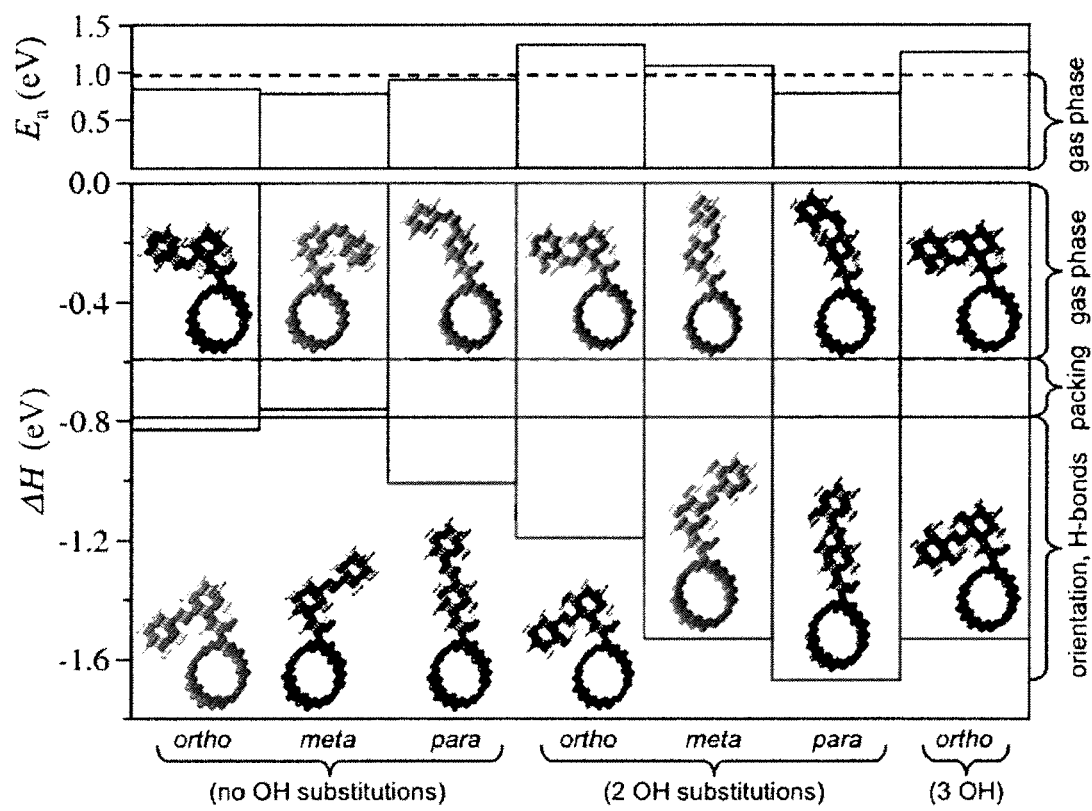
FIG. 3 shows DFT-computed values of ΔH and $E_a$ for a representative sample of the azo/CNT systems studied.

FIG. 2 illustrates calculated properties of a row of cis-2,2'-dihydroxy-diazobenzene molecules covalently bound to an (8,0) CNT via amide linkers at the para position. FIG. 3 shows the computed values of $\Delta H$ for a number of representative azo/CNT systems.

As the figure indicates, a significant increase in $\Delta H$ compared to an isolated azobenzene molecule (dashed line) was observed in all cases. The increased energy difference between the cis and trans configurations arose from a combination of effects, as emphasized by the shaded regions for the examples shown in FIG. 3. In particular, the increase of $\Delta H$ with respect to isolated azobenzene arose from the presence of the CNT substrate which (i) imposes a close-packed crystalline-like state, (ii) breaks molecular symmetry, and (iii) enables design of specific ordered, fixed interactions between functional groups on neighboring molecules.

The primary role of the CNT is to facilitate a crystalline, closepacked, ordered arrangement of the photactive molecules. The effect of the molecular packing is demonstrated in FIG. 2b, which plots the energy of cis and trans azobenzene molecules as a function of their separation distance. As the figure shows, the energy of the metastable cis isomer (circles) initially decreased with decreasing intermolecular distance due to attractive π-π interactions between neighboring molecules, which led to a shallow minimum for a separation of ~6 Å. Below 6 Å, the energy increased steeply as repulsive interactions began to dominate the behavior. As demonstrated by the large deviations in both the C—N=N angle and the angle between intramolecular phenyl groups in this regime (FIG. 2c), neighboring azobenzene groups prevent each other from attaining their minimum energy geometry, decreasing the overlap of the N—N π states and thus weakening the diazo bond and shifting the highest occupied molecular orbital (HOMO) significantly upward in energy.

In contrast, the energy of the trans state (squares) exhibited a minimum for an intermolecular separation of ~4.24 Å, the distance between every fourth carbon atom along the CNT axis. In this case, steric effects did not play an important role, as the molecules were essentially planar in the trans state. Instead, the optimal intermolecular distance was determined primarily by the interactions between π-electrons in neighboring phenyl rings. The net result of the packing interactions was thus a large increase in the magnitude of $\Delta H$ with decreasing intermolecular distance. As FIG. 2b shows, the packing interactions due to unsubstituted azobenzene alone led to a net increase of 0.2 eV per molecule in the magnitude of $\Delta H$ for a spacing of 4.24 Å. In other words, the formation of an ordered close-packed array increased the energy storage capacity per molecule by ~30% compared to gas-phase azobenzene.

It is clear that van der Waals interactions, which can be poorly described within DFT (depending on the choice of functional), can play an important role in these ordered structures. A set of test calculations was therefore performed with several functionals that provided a more accurate description of weak interactions. Employing the semiempirical Grimme functional as implemented in Quantum Espresso and the wB97XD and M06 hybrid functionals in Gaussian09, a 12-17% reduction in $\Delta H$ for all of the systems in FIG. 3 was observed. However, a similar reduction was also observed in the computed $\Delta H$ values of the corresponding nontemplated azobenzenes; for example, the value of $\Delta H$ for unsubstituted azobenzene in the gas phase was found to be 0.49 eV, which was smaller than both the PBE-GGA and the experimental values (~0.59 eV). Consequently, the fractional increase in $\Delta H$ due to the packing interactions on the CNT template was relatively insensitive to the inclusion of weak interactions. In addition to providing a template for ordered interactions, the CNT substrate also produced a significant effect on $\Delta H$ by breaking the symmetry of the azobenzene molecules. When the molecules are bound to the CNT, several orientations were possible depending on the position of the linker group with respect to the nitrogen double bond in the azobenzene. The large geometry changes and the subsequent changes in $\Delta H$ are illustrated for three different azo derivatives bound to CNT substrates with ortho, meta, and para attachments. In most of the azo/CNT systems investigated, the ortho attachment was energetically preferred over the other possible attachments in both the cis and trans states. This stability, which arose from strong proximity-induced interactions between the linker and the azobenzene and between the azobenzene and the CNT, resulted in a relatively minor increase in $\Delta H$ for the non-substituted azobenzene, as indicated in FIG. 3. In contrast, systems with the linker in the para position tended to have the least stable cis configuration, resulting in larger values of $\Delta H$.

In addition to packing and orientation effects, the CNT substrate enabled specific, fixed interactions between neighboring molecules, which can have significant effects on the energetics of the system. For example, in the hybrid nanostructure, substitutional groups can interact with neighboring molecules with a much higher frequency than in solution. Furthermore, they interact in an ordered manner, potentially providing a systematic route toward designing the properties of the hybrid nanostructure.

Figure 4:
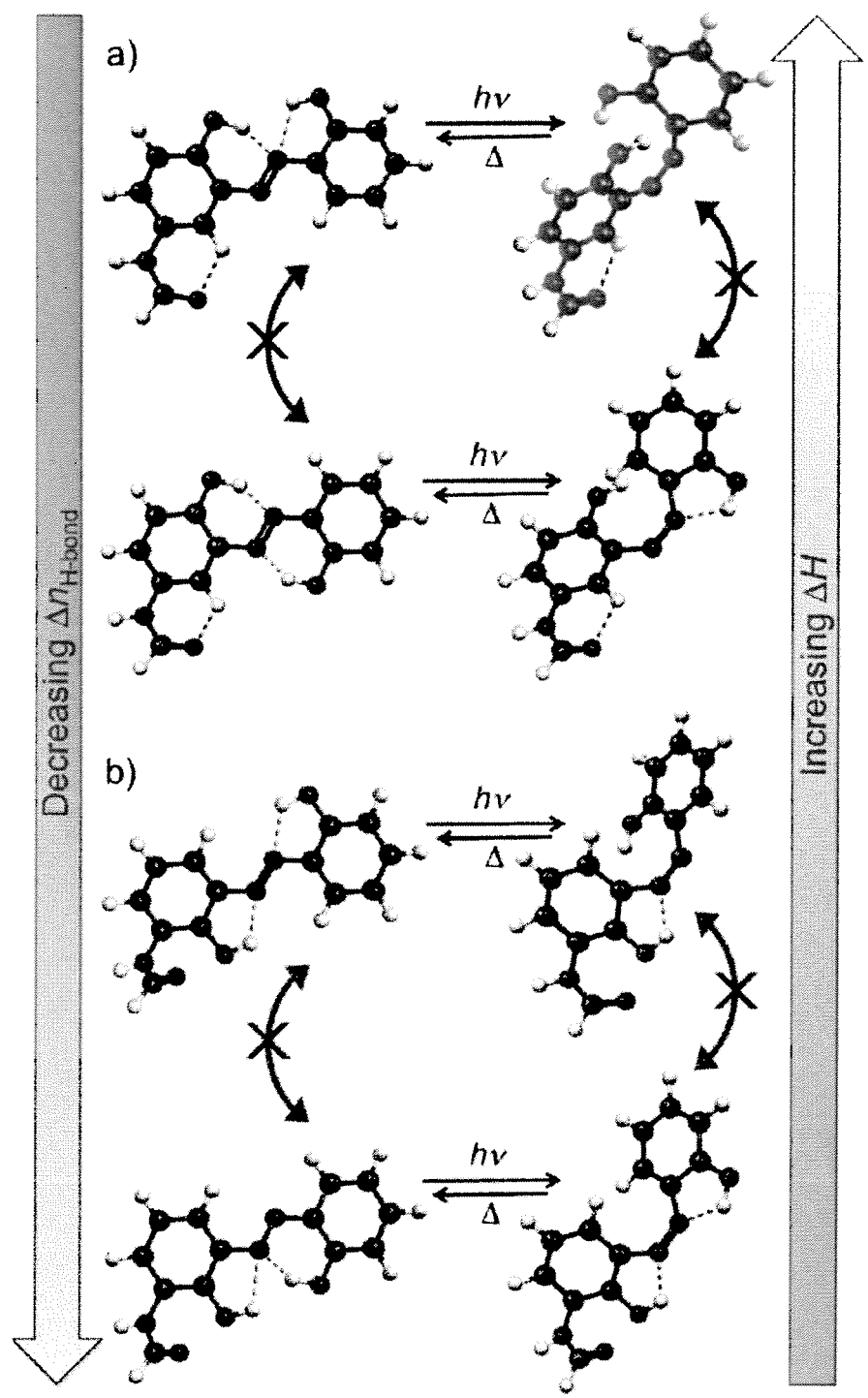
FIG. 4 illustrates hydrogen bonding effects in azo/CNT systems. The cis and trans isomers of several possible dihydroxy azobenzene molecules bound to a CNT substrate via an attachment at the meta position. The CNT substrate broke the symmetry of the azobenzene, increasing the potential phase space for H-bond formation: the close-packed arrangement prevented isomerization via rotation of phenyl rings, increasing the number of distinguishable states. This behavior also preserved H-bond interactions at high temperatures. Examples of isomerization pathways that were available in azobenzene but inhibited in the azo/CNT nanostructures are indicated by the crossed out arrows.

Substitution of hydroxyl groups for one or more hydrogens on the phenyl rings has been investigated, with the aim of modifying the relative stability of the two isomers via the addition of H-bonds. In general, structures with more H-bonds and/or stronger (shorter) H-bonds are more stable; thus, maximizing the number of H-bonds in the trans state while minimizing the H-bonds in the cis state will provide a larger $\Delta H$. In addition, H-bonds composed of OH . . . N are typically found to be stronger than those with OH . . . O. Because of the symmetry breaking imposed by the CNT, it was therefore possible to optimize $\Delta H$ by choosing the position of hydroxyl groups (or other functional groups). For example, FIG. 4, which shows several possible patterns for two OH groups on an azobenzene with a linker in the meta position, illustrates the dependence of $\Delta H$ on the relative positions of two hydroxyl groups; these positions determined the number and strength of the H-bonds in the cis and trans configurations. As FIG. 3 shows, these interactions provide a very effective means of tuning the properties of the solar thermal fuel; just considering two hydroxyl substituents yielded an increase in the energy stored per molecule of up to a factor of 3 compared to gas phase azobenzene; additional hydroxyl groups and/or other functional groups may increase $\Delta H$ even further.

The utility of a solar thermal fuel is contingent not only upon its energy storage capacity but also on its thermal stability in the photoexcited state. In most azobenzene derivatives, the half-life of the photoexcited state is on the order of minutes to hours due to a relatively low thermal barrier for the cis-trans back reaction. See, for example, Sanchez, A. M.; de Rossi, R. H. J. Org. Chem. 1995, 60, 2974; and Haitjema, H.; Y, T.; Challa, G. Macromolecules 1995, 28, 2783; each of which is incorporated by reference in its entirety. As mentioned above, simultaneously increasing both $\Delta H$ and $E_a$ is challenging, as methods to increase the former often rely on decreasing the latter. This is observed, for example, for the unsubstituted meta- and ortho azo/CNT structures illustrated in FIG. 3; the increase in $\Delta H$ relative to gas phase azobenzene was almost all due to the destabilizing effect of the packing interactions on the cis isomer, which leads to a concomitant decrease in $E_a$.

One can, however, increase both $E_a$ and $\Delta H$ by designing interactions that will stabilize the cis configuration by some amount E and the trans configuration by some larger amount $E+\delta E$. As a result of the symmetry-breaking, the short intermolecular separation, and the fixed orientation of azobenzene molecules on a CNT substrate, the positions of functional groups provide an ideal means by which to achieve this goal. For example, in the simplest picture, increasing the stability of the cis configuration by enabling the formation of n H-bonds, each with an average energy of $\langle E_{H\text{-}bond} \rangle$, while also stabilizing the trans state with n+1 H-bonds will increase both $E_a$ and $\Delta H$ by $\langle E_{H\text{-}bond} \rangle$.

Figure 1B:
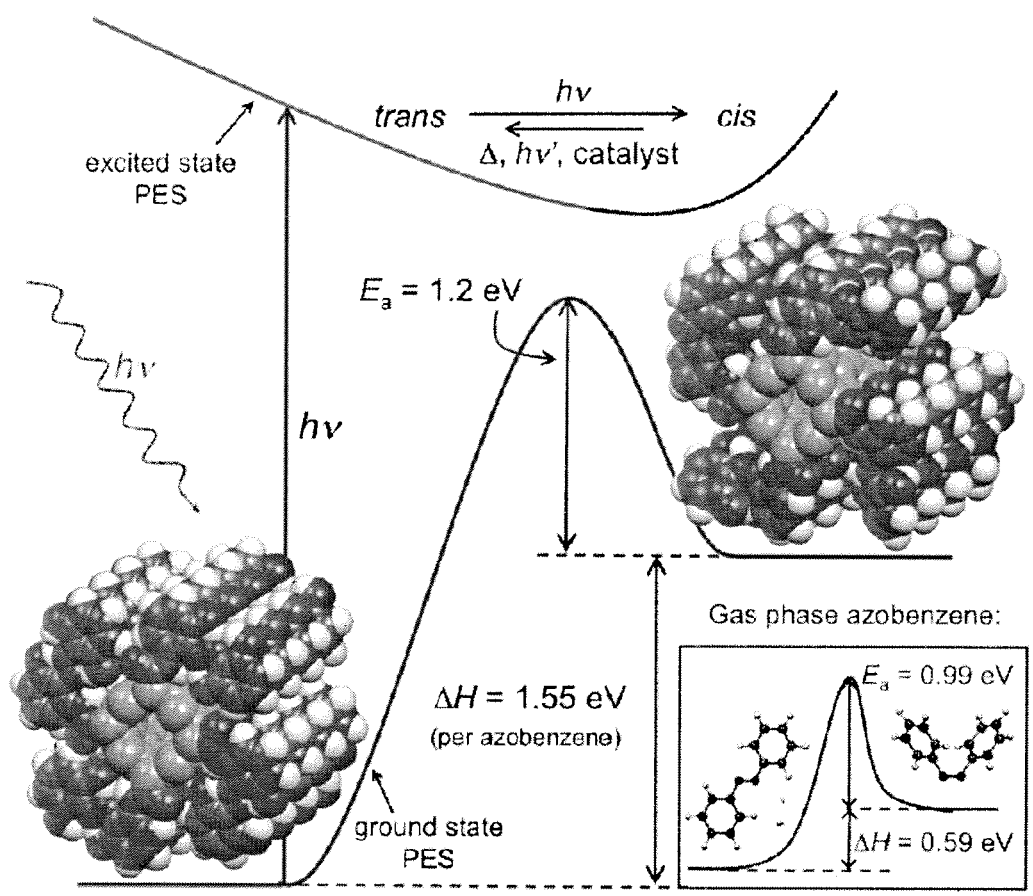
FIG. 1b further schematically illustrates solar thermal energy storage.

FIG. 1b illustrates a successful example of an azo/CNT nanostructure with both enhanced energy storage and thermal stability. In this case, six H-bonds per molecule (four intramolecular H-bonds and two intermolecular H-bonds formed between neighbors around the CNT circumference) significantly stabilized the trans configuration, while four H-bonds per molecule increased the stability of the cis configuration. The net result was a 260% increase in $\Delta H$ and a 20% increase in $E_a$ relative to gas phase azobenzene. Using the experimental rate for the thermal cis-trans reaction (see, e.g., Rau, H. Photochemistry and Photophysics; CRC Press: Boca Ratan, 1990), and the computed values of $E_a$, the photoexcited state of the azo/CNT nanostructure shown in FIG. 1b was predicted to exhibit a half-life of greater than one year, an enormous improvement in stability compared to gas phase azobenzene.

Figure 5:
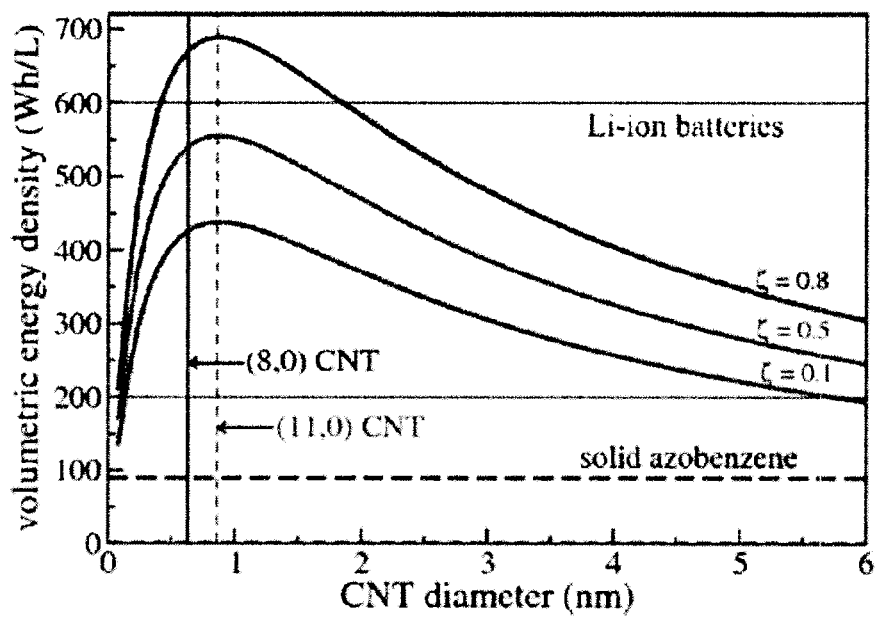
FIG. 5 illustrates the volumetric energy density as a function of CNT diameter for several nanotube packing densities (ζ). For comparison, the shaded region indicates the range for Li-ion batteries, and the horizontal dashed line shows the value for solid azobenzene. The volumetric energy densities of azobenzene and Ru-fulvalene solutions (<0.1 Wh/l) are not seen on this scale. Note that the gravimetric energy density of the azo/CNT fuel, which is independent of the CNT diameter for constant coverage, was similar to that of both Li-ion batteries and Ru-fulvalene, all of which are around 100-200 Wh/kg.

Depending on the azo orientation, an (8,0) carbon nanotube was found to support 4-8 azobenzene molecules around the circumference for each 4.24 Å distance along the CNT long axis. Approximating each azo/CNT nanostructure as a cylinder with outer bounds determined by the van der Waals radii, and assuming the maximum packing efficiency for cylinders (79.2%), the azo/CNT systems discussed above can have volumetric energy densities up to 690 Wh/L (see FIG. 5), comparable to the theoretical volumetric energy densities in state of the art Li-ion batteries (200-600 Wh/L) (see, e.g., Chen, Y. H.; et al., Power Sources 2010, 195, 2851-62, which is incorporated by reference in its entirety), and 4 orders of magnitude greater than that of the Rufulvalene solar thermal fuel. The volumetric energy density of tetracarbonyl-diruthenium fulvalene was determined to be ~0.02 Wh/L based on the concentration reported in Phillippopoulos, C.; et al., J. Ind. Eng. Chem. Prod. Res. Dev. 1983, 22, 627-33, which is incorporated by reference in its entirety. Furthermore, the azo/CNT nanostructures exhibited a 7-fold increase in volumetric energy density compared to solid azobenzene (~90 Wh/L); an even larger improvement was observed relative to various substituted azobenzenes in solution, which have volumetric energy densities on the order of $10^{-2}$ to $10^{-7}$ Wh/L, depending on the substituent and the solvent. See, e.g., Takagishi, T.; et al., Colloid Polym. Sci. 2007, 232, 693-9, which is incorporated by reference in its entirety. These values clearly illustrated the utility of including nanoscale components as a means to increase the energy storage capacity of common photoswitch molecules. The same approach can be applied to other photoswitch/nanoscale substrate hybrids.

The volumetric energy density estimated above was determined under the assumption that the azo/CNT nanostructures are sufficiently soluble in some medium to achieve a very high packing density (corresponding to a molar concentration of $\sim 4.6 \times 10^3$). Because of exposed OH functional groups on the outer "surface" of the hybrid nanostructures (e.g., see FIG. 1b), most of the nanostructures were predicted to be water-soluble. Tests showed that additional substitution with polar functional groups at positions that are exposed to the solvent in both the cis and trans states (and thus do not interact significantly with neighboring azobenzenes or the CNT substrate) can also be performed without a net change in $\Delta H$ or $E_a$, thereby enabling one to tune solubility as well. Furthermore, as a result of the close-packed array of azobenzene molecules on the CNT substrate, there is little room to admit solvent molecules in between azobenzene molecules, so one could, for example, also include hydrophobic interactions between azobenzene molecules without impacting the water solubility of the system.

In addition to high solubility, the functionalized nanotubes may achieve a very high concentration given that the photoactive azobenzene molecules on each nanotube are already in a crystalline state. For example, an azo/CNT nanostructure in a dilute water solution will have a shell of solvent water molecules interacting via hydrogen bonds with the exposed OH groups. Similarly, an azo/CNT nanostructure in a close packed array of azo/CNT nanostructures will also interact primarily via H-bonds, in this case between OH groups on neighboring azo/CNT nanostructures as well as with OH groups on surrounding water molecules. Therefore, one can reasonably consider formation of a highly concentrated solution.

Figure 6:
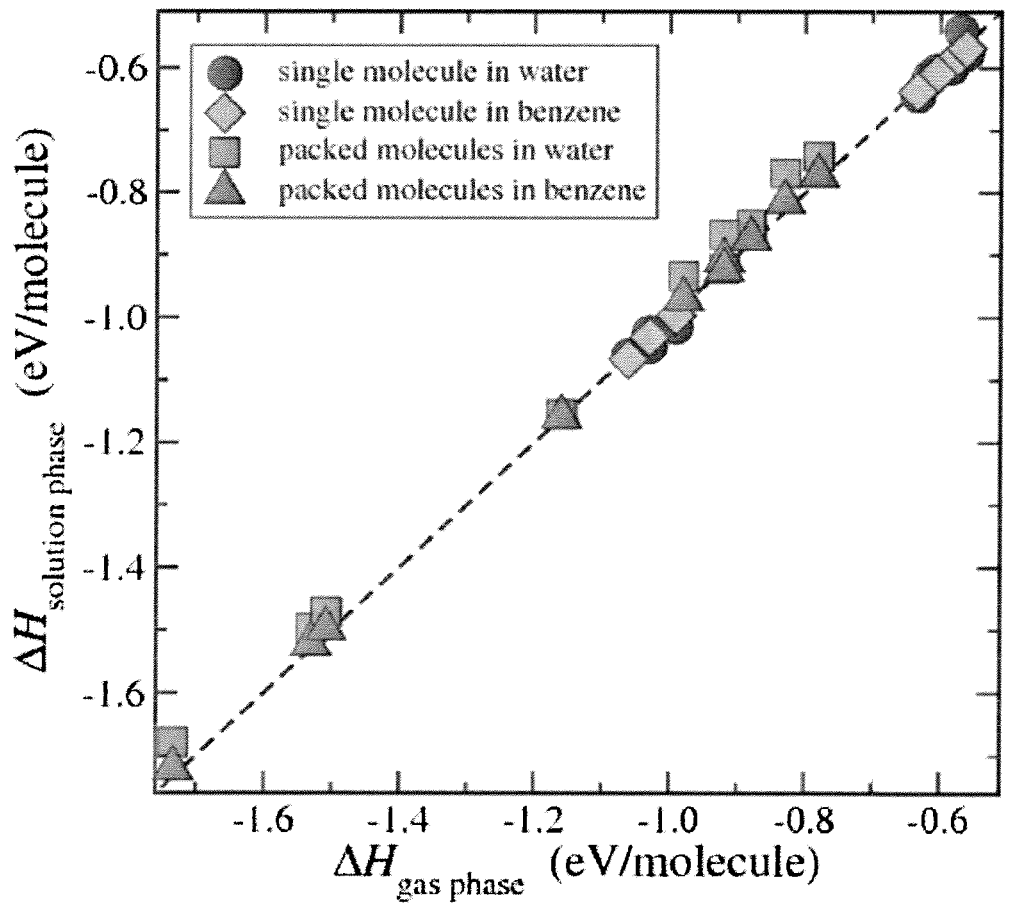
FIG. 6 illustrates computed values of ΔH for templated azobenzene derivatives in both water (squares) and benzene (triangles) solvents, compared to the computed gas-phase ΔH values, demonstrating the small effect of solute-solvent interactions. Similar changes in the magnitude of ΔH occur for the corresponding free azobenzenes (circles and diamonds for water and benzene solutions, respectively); thus, the relative increase in ΔH due to the CNT template was essentially independent of the solvent.
Figure 7:
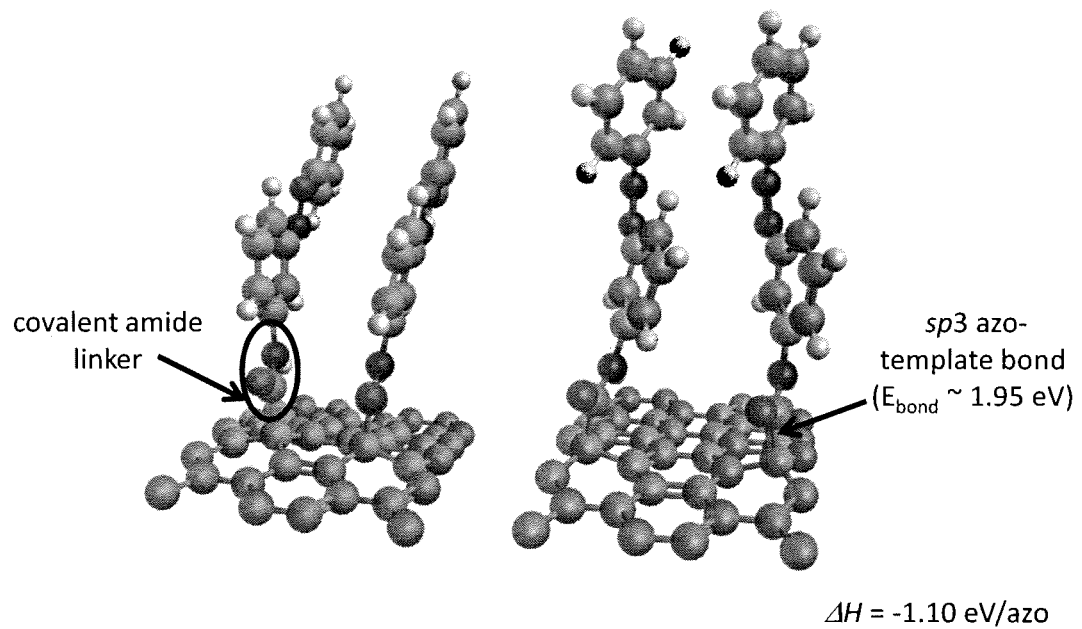
FIG. 7 is a schematic depiction of azobenzene moieties linked to a graphene template
Figure 8:
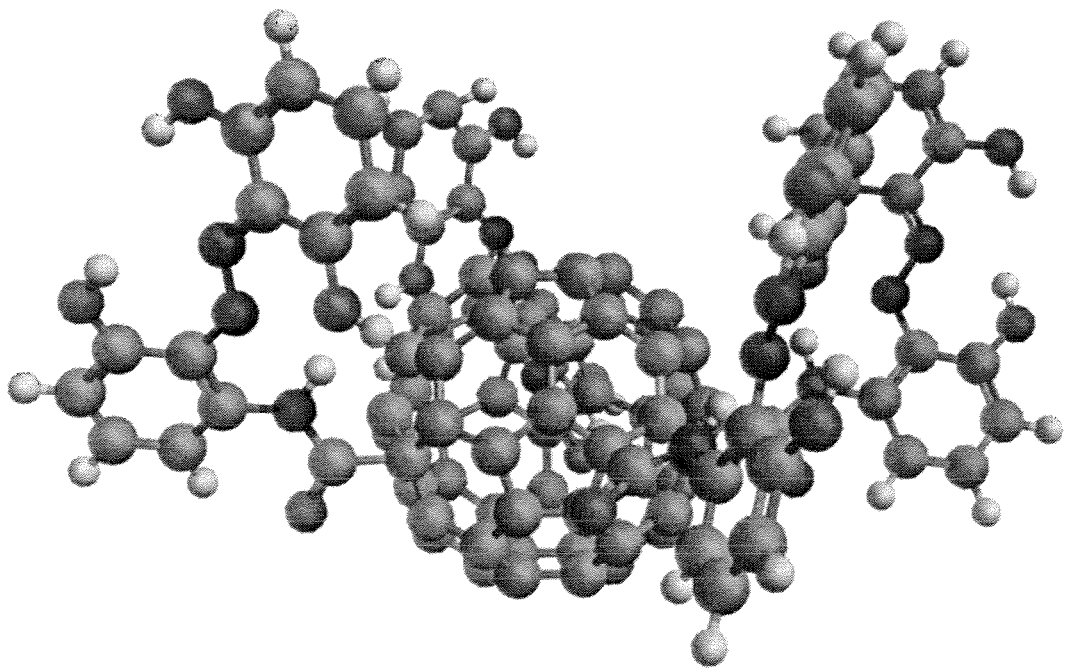
FIG. 8 is a schematic depiction of azobenzene moieties linked to a fullerene template.
Figure 9:
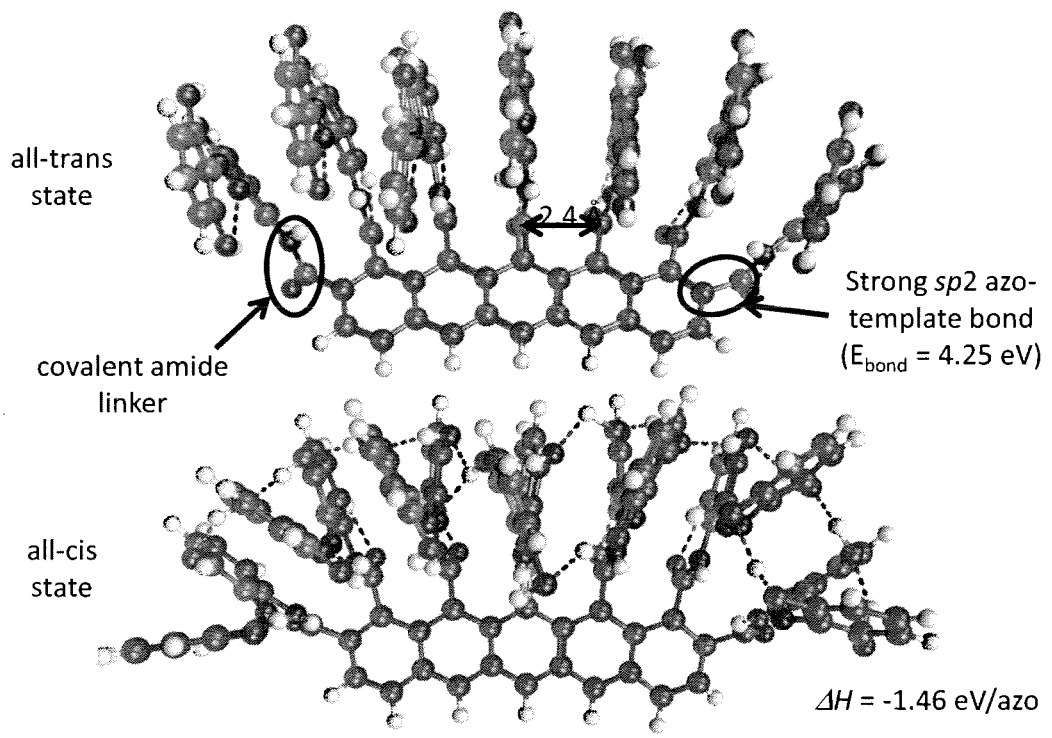
FIG. 9 is a schematic depiction of azobenzene moieties linked to a pentacene template.

The concentration-independent close-packed crystalline structure of the azobenzene adsorbates also suggested that the presence of a polar solvent will not disrupt the H-bond interactions that play such an important role in determining ΔH and $E_a$, as most interactions with the solvent will be mediated through surface polar groups and thus not affect the intra- and intermolecular interactions between azobenzene molecules. As a first-order test of this prediction, DFT calculations including solvent effects for 11 different templated azobenzene derivatives (including all those in FIG. 3) were performed via the polarizable continuum model implemented in Gaussian09. As illustrated in FIG. 6, the results confirmed the minor role of solvent interactions, showing only a small change in ΔH (3 and 2% decreases for water and benzene solvents, respectively) over all 11 derivatives.

An important consequence of this behavior was that, unlike H-bonds between free molecules in solution, the H-bond interactions in the azo/CNT system did not provide a significant entropic contribution to the free energy of the system by breaking and reforming with high frequency. Breaking an inter- or intramolecular H-bond in the ordered state requires rotation of the phenyl rings, a mode that is sterically inhibited by the short intermolecular separation of the azobenzene molecules and the rigidity of the structure. Test computations of the barrier to phenyl rotation for close-packed azobenzene molecules confirmed this picture, indicating that events requiring such rotations will not occur at any reasonable temperature.

While simultaneously increasing the volumetric energy density and the thermal stability is an important goal in designing a practical high-energy density solar thermal fuel, several other properties require consideration. In particular, the heat released by the back reaction is important in many applications. Assuming that the heat capacity, $C_p$, is similar to that of azobenzene, the temperature of the heat released upon cis-trans isomerization in the azo/CNT system is $T_{released} \approx \Delta H/C_p = 620$ K. In contrast, $T_{release} \approx 220$ K for azobenzene without the CNT substrate. Investigation into mechanisms for lowering the heat capacity could enable the hybrid system to produce even higher temperatures; further increases in ΔH will also lead to increases in $T_{release}$.

Finally, knowledge of the overall efficiency of the solar-to-heat conversion in the azo/CNT nanostructures is useful for comparison between different types of energy conversion systems. The overall conversion efficiency of the azo/CNT solar thermal fuel is given by $\eta = f_{absorbed} f_{converted}$, where $f_{absorbed}$ is the fraction of the AM1.5 solar irradiance absorbed by azobenzene and $f_{converted}$ is the fraction of photons that are stored and eventually converted to heat. Assuming that every absorbed photon induces an isomerization event, the latter is given by $f_{converted} = \Delta H \int_0^{v_{gap}} hv dv$, where $hv_{gap} = E_{gap}$ is the band gap (or the energy difference between the highest) of azobenzene (~2.8 eV). For ΔH=1.7 eV, we find a total efficiency, representing both conversion and storage, of $\eta = 7.2\%$.

As shown by DFT computations, combining the photoactive behavior of well-known photoisomers with the structural stability and nanoscale properties of CNTs, one obtains a set of highly tunable hybrid nanostructures that exhibit large increases in both the energy storage capacity per molecule and the number of photoactive molecules per volume. Together, these properties result in volumetric energy densities ~$10^4$ greater than that of the Ru-fulvalene solar thermal fuel and equivalent to or higher than those reported for state-of-the-art Li-ion batteries.

In addition, intermolecular interactions available in the hybrid nanostructures can simultaneously increase the energy storage capacity and the lifetime of the photoexcited state. Thus, a clean, renewable, and potentially economically feasible pathway toward long-term storage and convenient use of solar energy on a large scale is described. In addition, other hybrid photoisomer-nanostructure hybrids can be created using other photoactive molecules, different substrates, and different linker chemistries, to provide a range of degradation resistant, high-stability, high-energy density solar thermal fuels.

Figure 10:
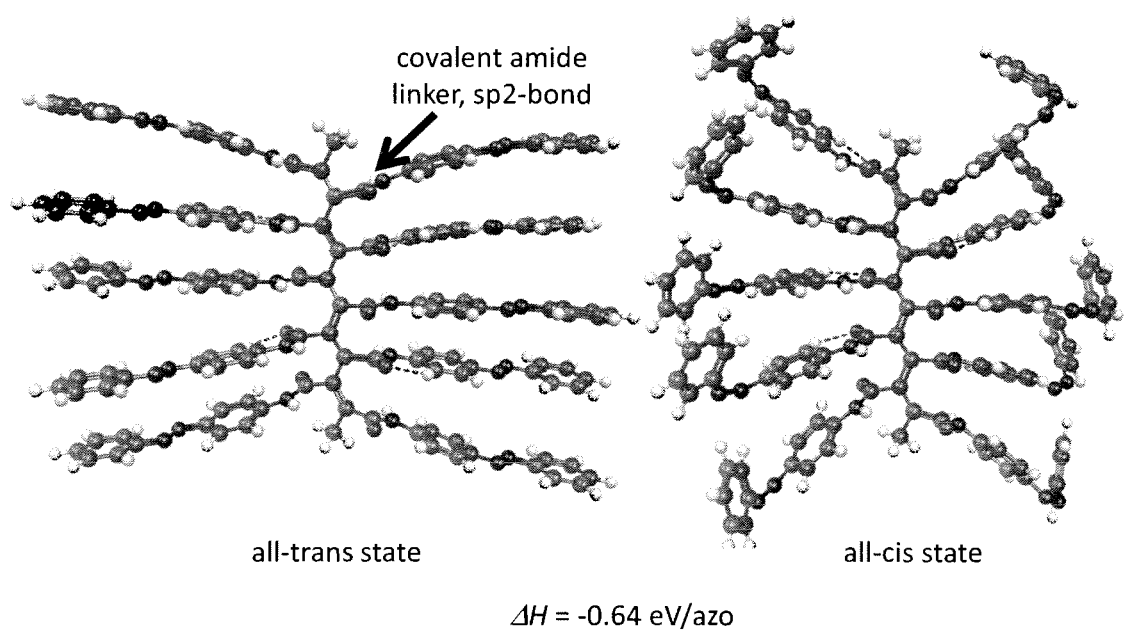
FIG. 10 is a schematic depiction of azobenzene moieties linked to a conjugated alkene template.
Figure 11:
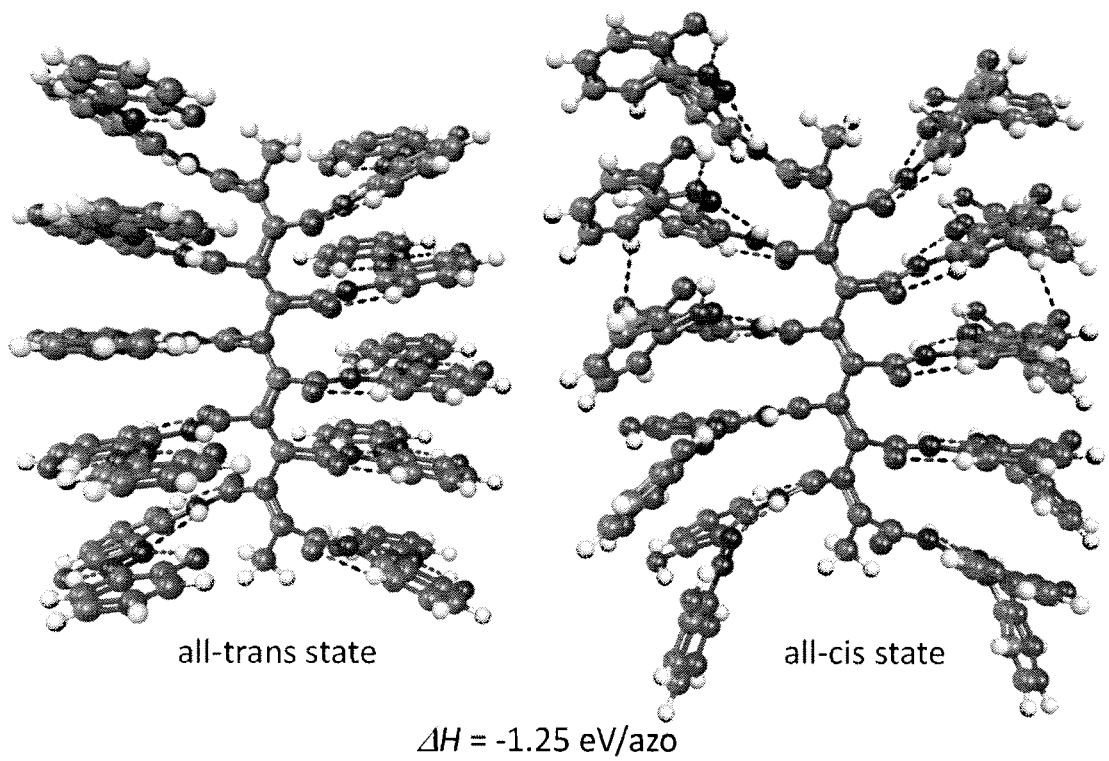
FIG. 11 is a schematic depiction of azobenzene moieties linked to a conjugated alkene template.
Figure 12:
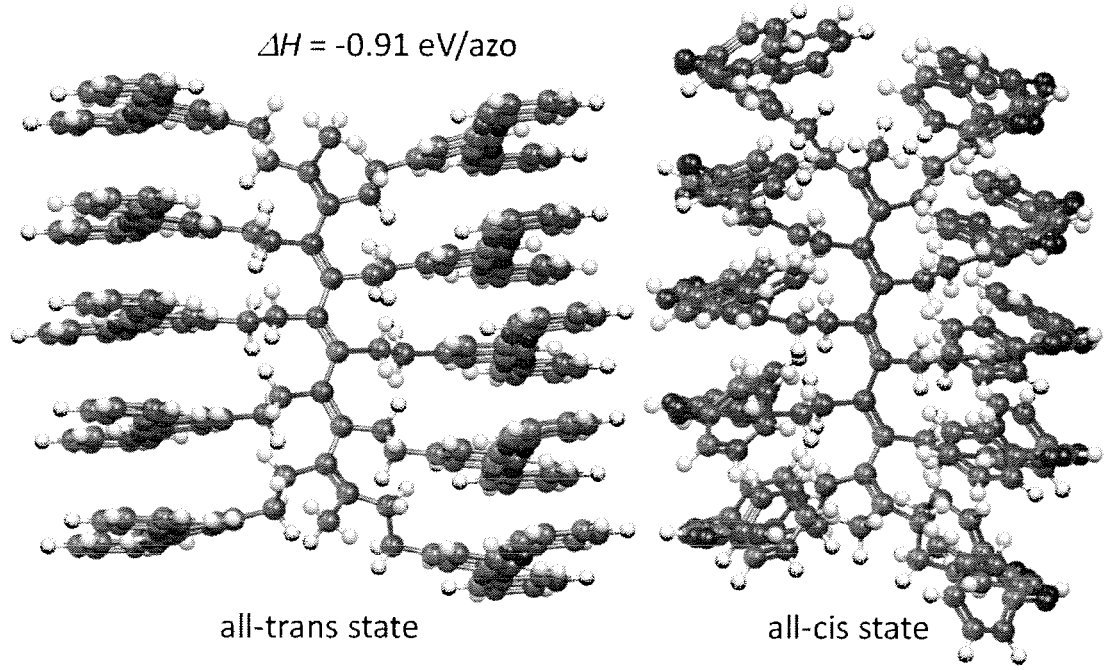
FIG. 12 is a schematic depiction of azobenzene moieties linked via phenyl linkers to a conjugated alkene template.
Figure 13:
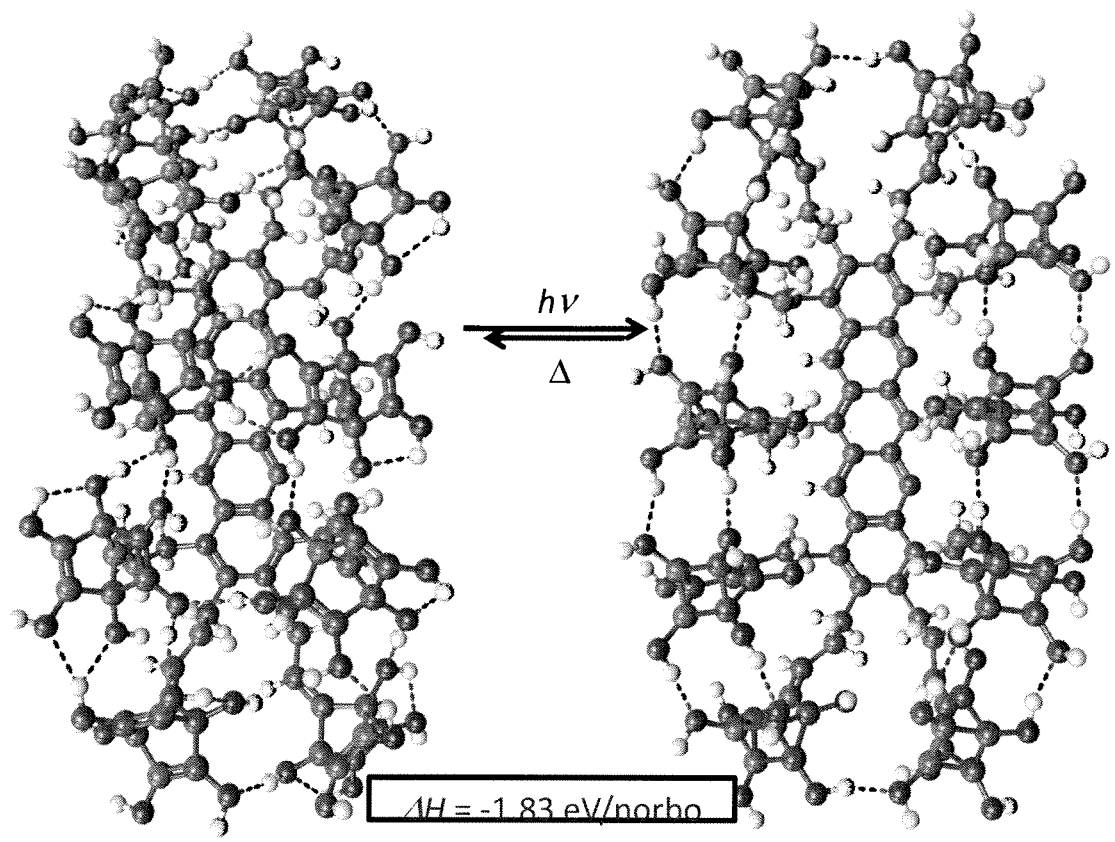
FIG. 13 is a schematic depiction of norbornadiene moieties linked to a pentacene template.
Figure 14:
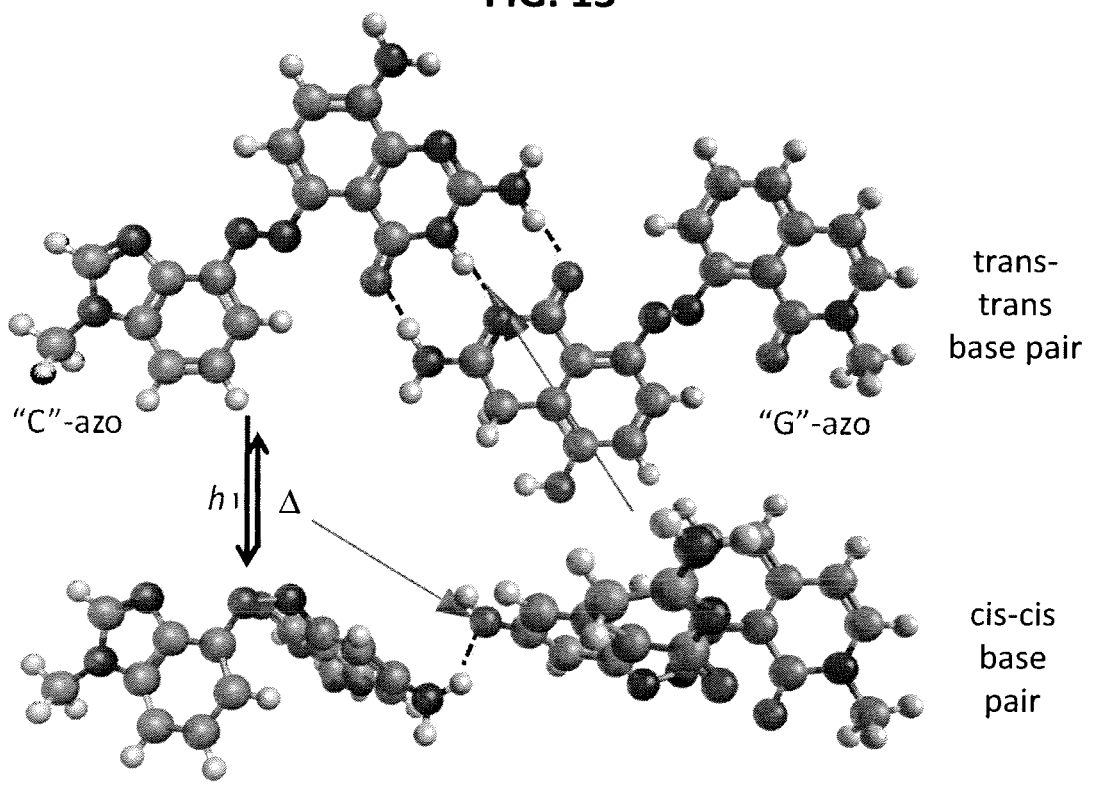
FIG. 14 is a schematic depiction of modified nucleotide-azobenzene photoisomers (MNAPs).
Figure 15A:
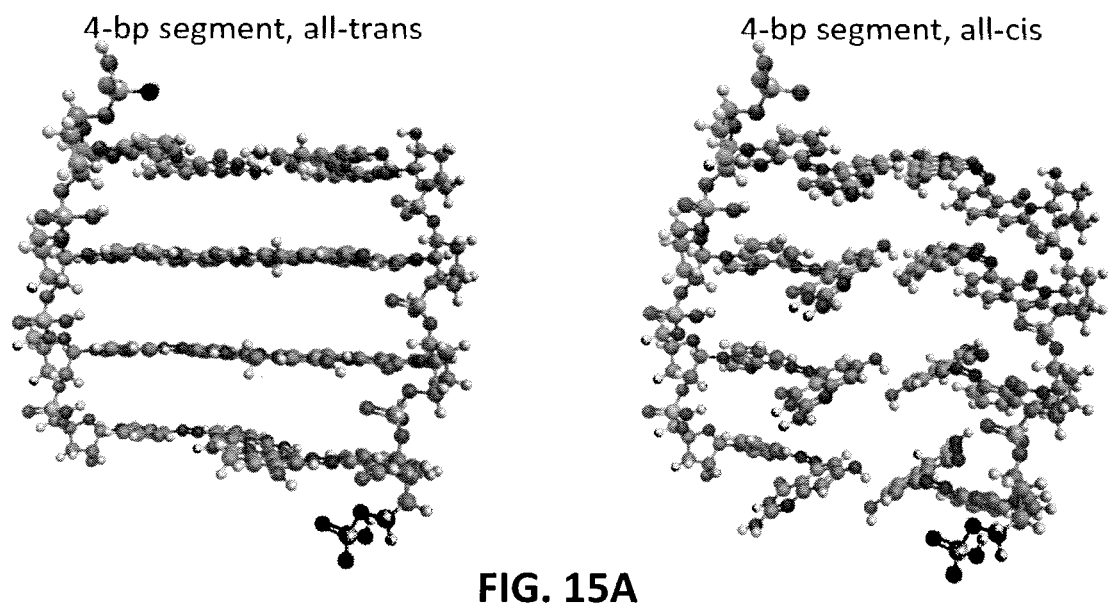
FIGS. 15A-15C are schematic depictions of a segment of an MNAP double helix.
Figure 15B:
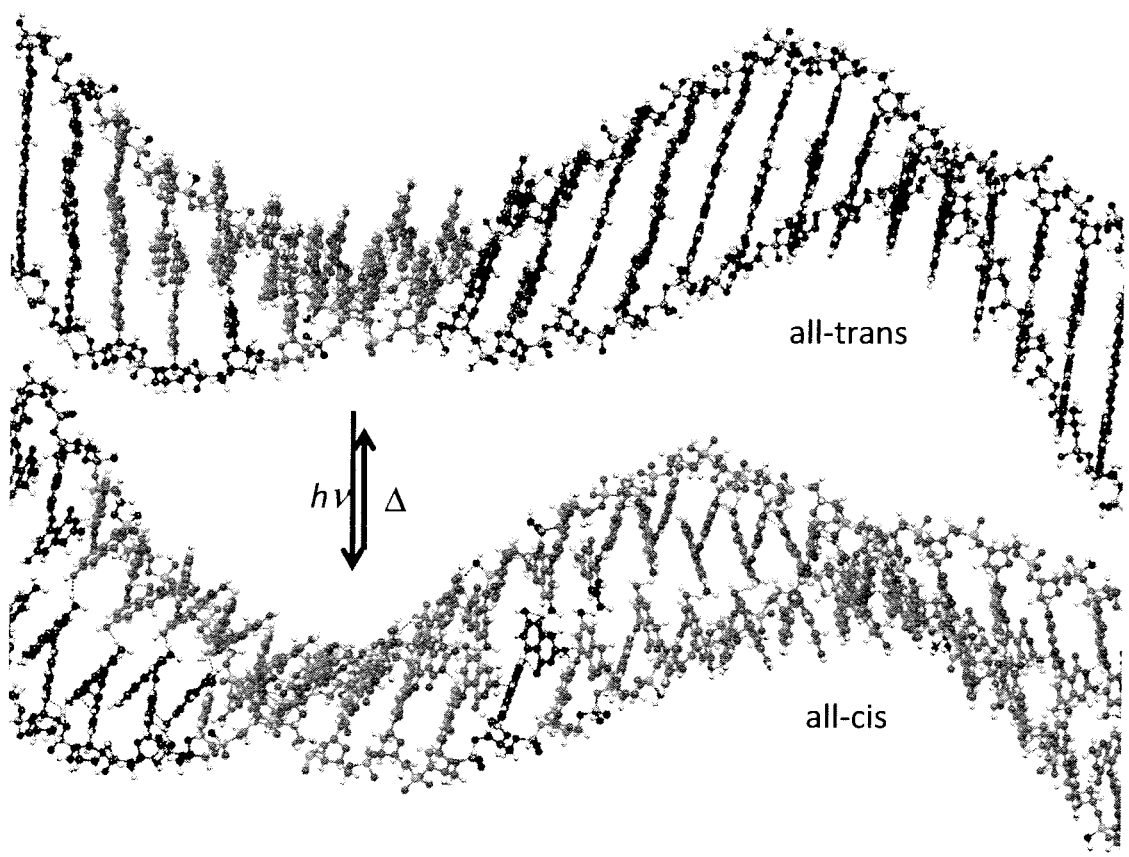
Figure 15C:
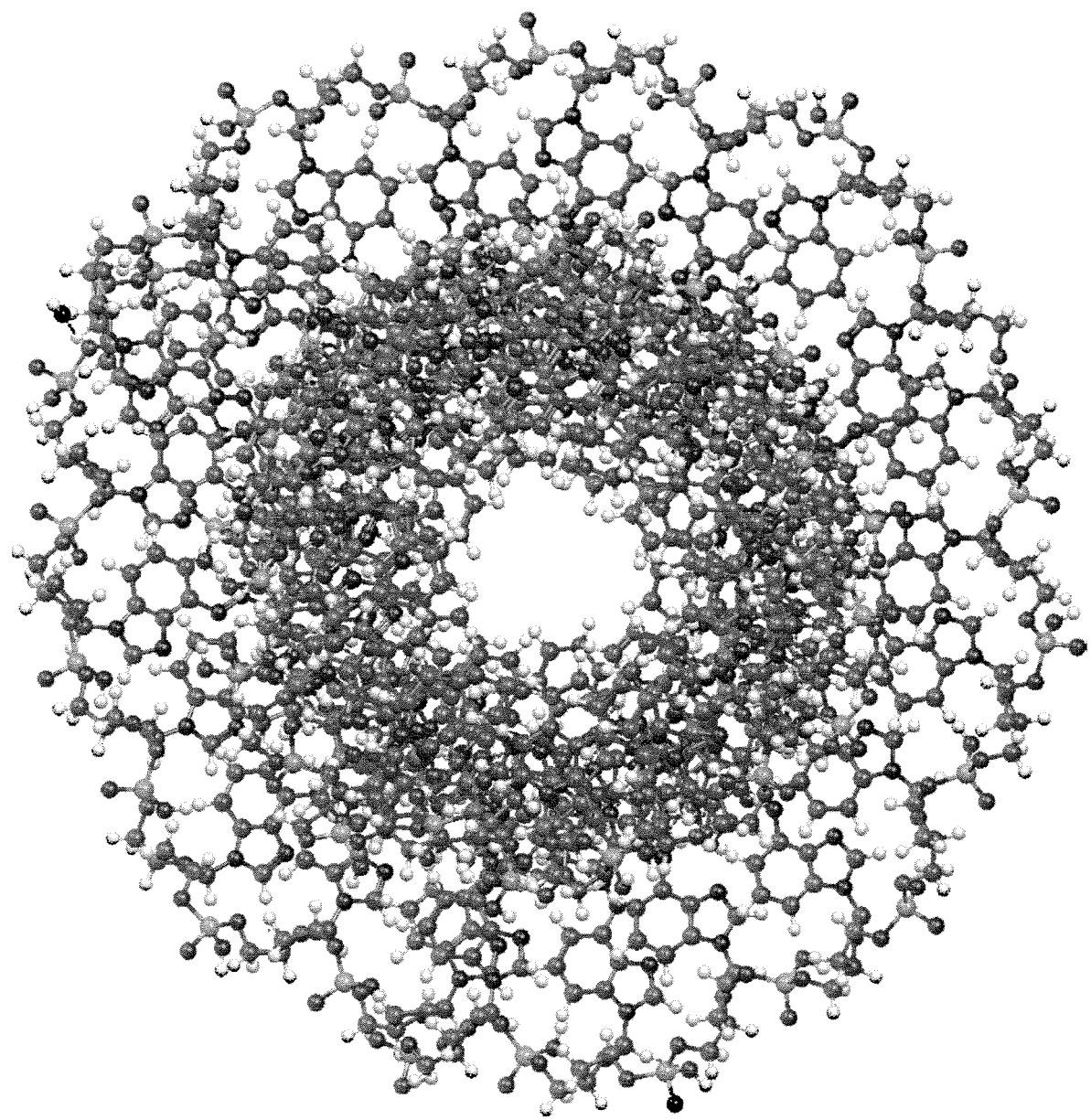
Figure 16:
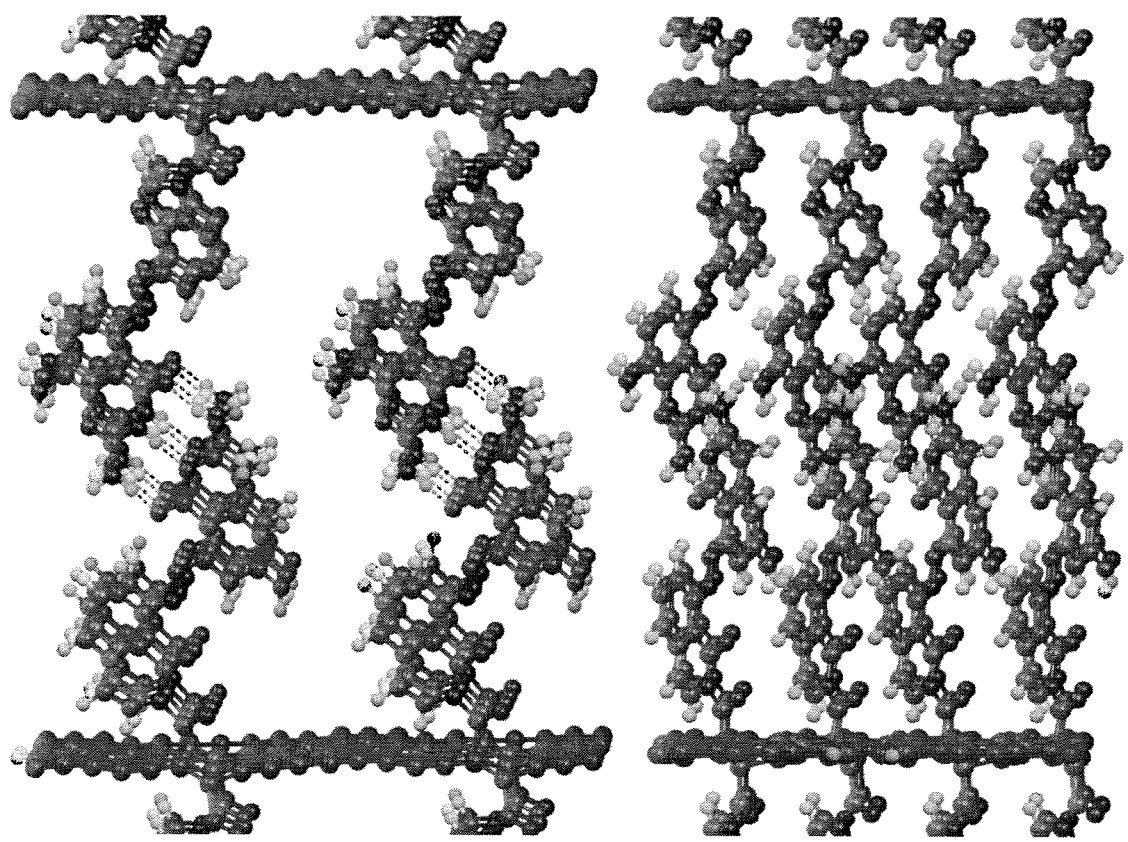
FIG. 16 is a schematic depiction of an MNAP-graphene hybrid nanostructure.

Other configurations of PSM and nanotemplate are possible. For example, FIGS. 7-12 illustrate solar thermal fuel materials including azo moieties linked to various templates: graphene (FIG. 7), a fullerene (FIG. 8), pentacene (FIG. 9), and conjugated alkene chains (FIGS. 10-12). FIG. 13 illustrates a norbornadiene-pentacene material. FIG. 14 depicts two photoswitchable moieties based on nucleotides (modified nucleotide azobenzene photoisomers (MNAPs), where the two photoswitchable moieties are capable of interacting via H-bonds in a manner analogous to the C-G Watson-Crick base pair. FIGS. 15A-15C show structures of DNA-like double helices including MNAPs in place of the naturally occurring A, C, G, and T bases. FIG. 16 illustrates a material using graphene as a template and MNAPs as photoswitchable moieties.

We examined the behavior of two general classes of azobenzene derivatives, illustrated in Scheme 1, bound to various template materials.

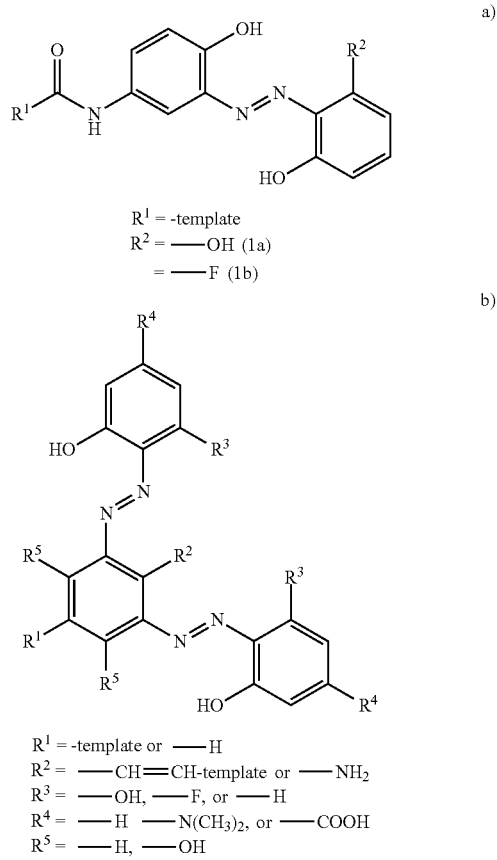

Scheme 1

PSMs in the first class (class I, scheme 1a) contain an amido (—CONH—) group meta to the nitrogen double bond that acts as a covalent linker to the template; this linker was chosen as it has been used successfully to functionalize CNTs with azobenzene molecules in previous experiments.

In addition to the amido linker, the class I azobenzenes have substituents at the three ortho positions not adjacent to the linker. Hydroxyl (—OH) groups were attached at the 2 and 2' carbons, and either —OH or —F was attached at the 6' carbon atom to form azobenzene derivatives 1a (m-amido-2,2',6'-trihydroxyazobenzene) and 1b (m-amido-2'-fluoro-2,6'-dihydroxyazobenzene), respectively.

The second class of azobenzene derivatives (class II, scheme 1b) contained PSMs formed by adding a (phenylazo-) group to azobenzene to make 1,3-bis(phenylazo) benzene derivatives. As the scheme indicates, the class II PSMs, which were covalently bound to the template via a direct C—C bond, contain two azo groups per attachment site to the template. Consequently, the amount of stored energy per molecule can be potentially doubled while only increasing the molecular weight (and volume) by about 33%, leading to significant gains in energy density.

Three particular class II derivatives were the subject of particular focus. The first, 1,3-bis(2',6'-dihydroxyphenylazo)-2-aminobenzene (2a; $R^1$=template, $R^2$=NH$_2$, $R^3$=OH, $R^4$=$R^5$=H) was a close analogue of 1a; the amino group in 2a replaces a hydroxyl group in 1a to enable the same number and position of H-bonds to form per azo group in both molecules. In the other class II molecules, 1,3-bis(2'-hydroxy-4'-carboxy-6'-fluorophenylazo)-2-amino-4,6-difluorobenzene (2b; $R^1$=template, $R^2$=NH$_2$, $R^3$=F, $R^4$=COOH, $R^5$=F) and 1,3-bis(2'-hydroxy-6'-fluorophenylazo)-benzene-4,6-diol (2c; $R^1$=H, $R^2$=template, $R^3$=F, $R^4$=H, $R^5$=OH), both the functional groups and/or the position of the template with respect to the azo groups are modified to further enhance the energetic and optical properties.

Figure 17:
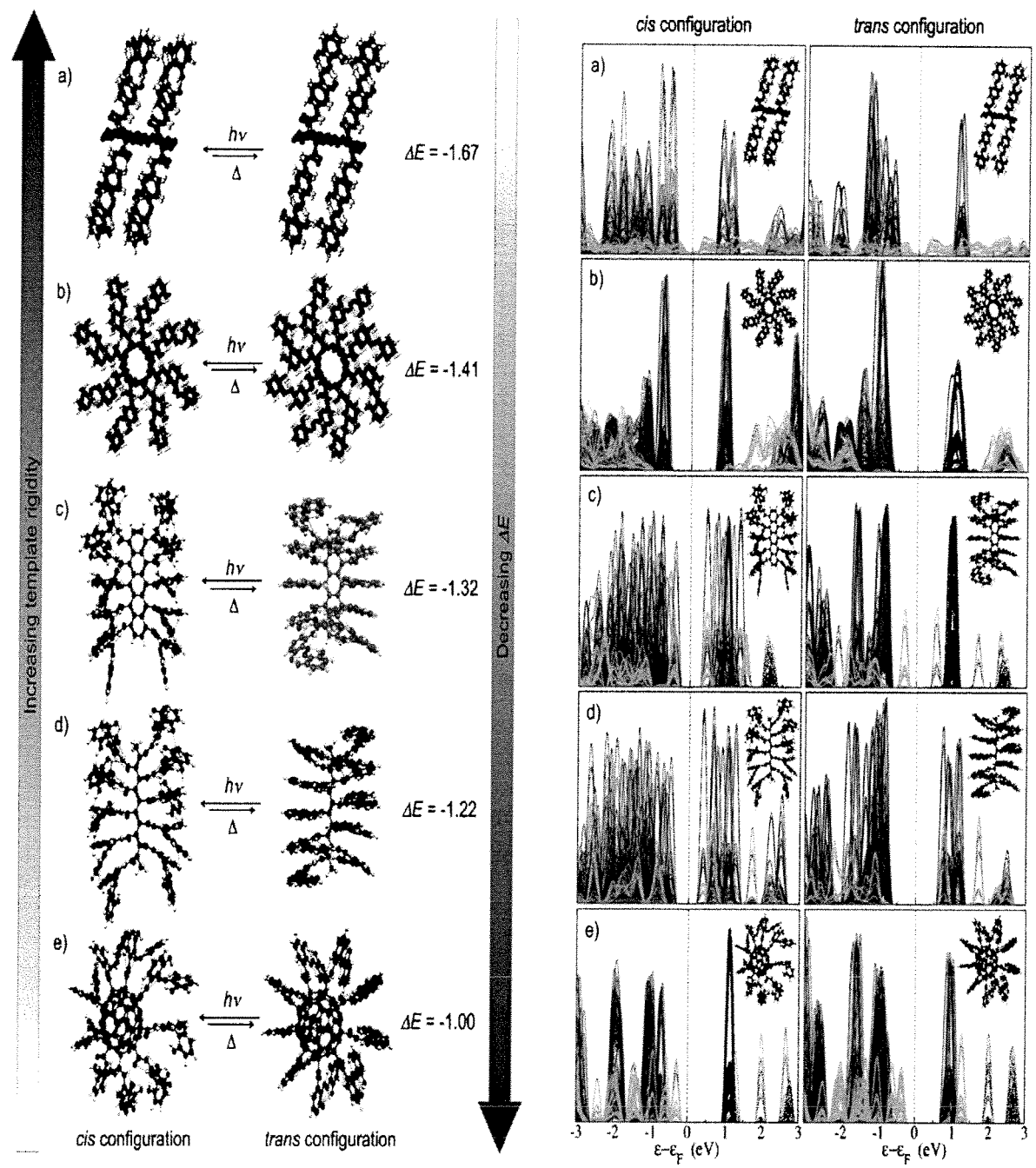
FIG. 17 shows optimized atomic structures, DFT-computed values of $\Delta \overline{E}$ (in eV/azo), and atom-projected DOS for molecules of 1a covalently bound to a) graphene, b), CNT, c) pentacene, d) dodecahendecaene, and e) fullerene templates. For comparison, the values of ΔE for gas phase azobenzene and gas phase 1a are −0.59 and −0.99 eV/azo, respectively.

The role of the template was investigated by determining the average energy stored per molecule $\Delta\bar{E}$ for class I molecules on each of the five templates. Here $$\Delta\bar{E} = \frac{1}{N}\sum_{i}^{N}(E_{trans}^i - E_{cis}^i)$$

where N is the number of distinct binding sites on a given template. For example, on a CNT template, one might expect all binding sites to be essentially identical (assuming an ordered phase), whereas the geometric and chemical environments of a photoisomer attached to an alkene chain molecular template will vary significantly depending on whether the binding site is near the center or at the end of the chain, as manifest in e.g. FIGS. 17c and 17d).

The ability of the template to constrain the molecular degrees of freedom of the bound photoisomers—or, put another way, the resistance of the template to photoisomer-induced deformation—played a key role in determining both the dominant type and the strength of interactions between neighboring photoisomers. In turn, these intermolecular interactions ultimately governed the amount of energy that can be stored in each photo-active molecule, as well as the thermal stability of the higher-energy state (i.e., the fully cis configuration). The variation in the degree of order in the photoisomer/template structures can be seen clearly in FIG. 17, which depicts the optimized atomic structures for the fully cis and fully trans configurations of the class I azobenzene/template hybrids. As the figure shows, the magnitude of $\Delta\bar{E}$ decreases significantly as the photoisomer arrays became less regular in going from the rigid graphene and CNT templates to the more flexible molecular templates such as pentacene and the 12-C alkene chain (dodecahendecaene).

In the most rigid photoisomer/template hybrid, the bound molecules formed a highly ordered two-dimensional array on the planar graphene template, as shown in FIG. 17a. As a result of this packing, rotations of the photoisomers (or parts of the photoisomers) were highly constrained by interactions with neighboring molecules or with the graphene itself. Since the extended nature of the graphene did not allow sufficiently large local template deformation to relax these constraints, the bound photoisomers were forced to adopt a highly strained configuration in the cis state. In addition, the bound molecules were unable to form the maximum number of inter- and intramolecular H-bonds possible in an all-cis configuration: the pathway to this configuration from the minimum energy trans configuration was blocked by steric interactions that prevent the required rotations of the untethered phenyl ring. In contrast, the molecules in the planar trans state, which were stabilized by two intramolecular H-bonds, decrease in energy due to p-stacking interactions in the packed phase. The net result was a large increase in $\Delta\bar{E}$ with respect to the gas phase.

Similar to graphene, CNT templates impose a highly ordered azobenzene phase in which the bound photoisomers were sterically prevented from rotation by the presence of close-packed neighbors along the nanotube axis (FIG. 17b). Similar to the graphene case, in the class I azo/CNT hybrid two intramolecular H-bonds (formed between the azo N atoms and two —OH substituents at ortho positions) stabilized the trans isomer, while a single intermolecular H-bond (formed between an —OH group and an azo N on a nearest-neighbor molecule) stabilized the cis isomer, which led to a significant increase in both $\Delta\bar{E}$ and $E_a$ relative to gas phase azobenzene. While the rigid nanotube template led to a highly ordered molecular packing along the CNT long axis, steric interactions with neighbors around the circumference of the nanotube were less important than in the azo/graphene hybrid, allowing for some relaxation of the strained cis configuration. Consequently, $\Delta\bar{E}$ was smaller than that observed in the graphene case.

In contrast to both graphene and CNTs, molecular templates such as pentacene or dodecahendecaene (a fully conjugated 12-C alkene chain) can deform significantly in order to accommodate strain induced by the bound photoisomers. Consequently, the photoisomers, which were ordered along one direction as shown in FIGS. 17c and 17d, were able to rotate a significant amount around the plane of the template in order to increase nearest-neighbor separation distances and attain configurations more like the gas phase. Such distortions were possible because the less-extended molecular templates can twist to minimize the resulting strain in the template-photoisomer C—C bonds. In addition, the much shorter length of the photoisomer array (here, five azo molecules, compared to potentially thousands on graphene or carbon nanotubes), allowed the photoisomers to fan out in the plane of the template, thus adopting a less strained cis configuration. As a result of the additional degrees of freedom available to photoisomers bound to a pentacene or alkene chain template, the increase in $\Delta\bar{E}$ with respect to the gas phase was smaller than that observed in the analogous azo/graphene and azo/CNT nanostructures.

Although the template itself did not deform significantly, a similar result was observed for photoisomers on fullerene ($C_{60}$): in this case, the high curvature of the template along all directions minimizes the impact of intermolecular interactions, as shown in FIG. 17e. As a result, the bound azobenzene molecules behaved quite similarly to their gas phase analogues, the energetic properties of which are summarized, along with those of the azo/template systems, in Table 1. Table 1 shows computed energetic properties. ΔH is the stored energy per azo group, $E_a$ is the thermal barrier (per azo group) to the cis-trans back reaction, $\rho_{grav}$ is the gravimetric energy density, and max $\rho_{vol}$ is the maximum volumetric energy density (i.e., for the material in a solid state). $T_{release}$ is the estimated temperature of the heat released upon triggering the cis-trans conversion, assuming the material has the same heat capacity as solid azobenzene. $t_{1/2}$ is the estimated half-life of the cis isomer, assuming the same prefactor as for unsubstituted azobenzene.

TABLE 1

| photoisomer | template | ΔH (eV/azo) | $\rho_{grav}$ (Wh/kg) | max $\rho_{vol}$ (Wh/L) | $T_{release}$ (K) | $E_a$ (eV/azo) | $t_{1/2}$ (days) |
|---|---|---|---|---|---|---|---|
| 1a | graphene | −1.67 | 135 | 306 | 696 | 1.17 | 115 |
| 1a (1b) | CNT | −1.59 (−1.73) | 129 (158) | 332 (360) | 664 (721) | 1.13 | 29 |
| 1a | pentacene | −1.26 | 118 | 249 | 548 | | |
| 1a | alkene chain | −1.22 | 114 | 234 | 508 | | |
| 1a | $C_{60}$ | −1.00 | 76 | 179 | 419 | 1.05 | 1.3 |
| 2a | CNT | −1.34 | 167 | 372 | 557 | | |
| 2a | pentacene | −1.29 | 192 | 387 | 537 | | |
| 2a | alkene chain | −1.24 | 191 | 376 | 516 | | |
| 2b | CNT | −1.72 | 157 | 430 | 717 | 1.31 | $2 \times 10^4$ |
| 2b | pentacene | −1.81 | 186 | 462 | 756 | | |
| 2c | graphene | | | | | | |
| 2c | CNT | | | | | | |
| 2c | pentacene | −1.74 | 214 | 523 | 726 | | |
| 2c | alkene chain | −2.01 | 254 | 610 | 839 | | |
| azobenzene | gas phase | −0.59 | 86 | 91 | 245 | 0.99 | 0.1 |
| 1a | gas phase | −0.99 | 97 | 129 | 411 | 1.12 | 21 |
| 1b | gas phase | −0.41 | 40 | 53 | 169 | 1.13 | 27 |
| 2a | gas phase | −0.91 | 145 | 185 | 378 | | |
| 2b | gas phase | −1.11 | 128 | 166 | 461 | | |
| 2c | gas phase | | | | | | |

Although a decrease in the magnitude of ΔE was observed with decreasing template rigidity for the class I azobenzene/template nanostructures, the data in Table 1 showed that, with the exception of the fullerene, all of the template materials considered enhanced the desired energetic properties of the bound photoisomer, demonstrating the general extensibility of the templating concept for designing solar thermal fuels with increased energy density and thermal stability. The trend observed in FIG. 17 suggests that the energy storage capacity of the molecular templates can be increased by making them less flexible and thereby increasing the ordering of the bound photoisomers.

Figure 18:
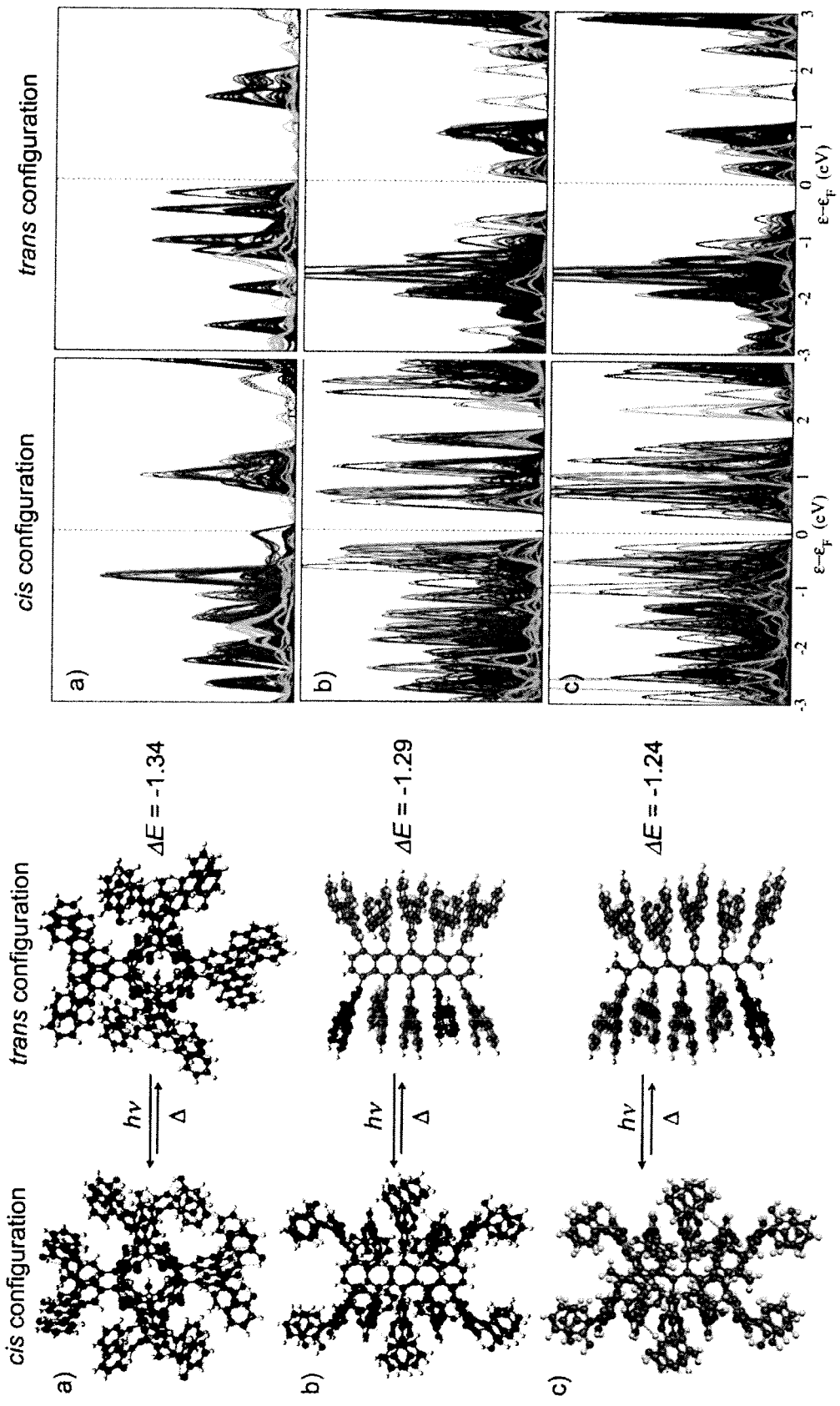
FIG. 18 shows optimized atomic structures, DFT-computed values of $\Delta \overline{E}$ (in eV/azo), and atom-projected DOS for a) 2a/CNT, b) 2a/pentacene, c) 2b/CNT, d) 2c/pentacene, and e) 2c/dodecahendecaene photoisomer/template hybrid nanostructures.

FIG. 18, which shows the optimized atomic structures and ΔE values for class II azobenzene/template hybrids, illustrated one successful method for increasing the order of the photoisomer array on pentacene and dodecahendecaene templates: increasing the rigidity of the photoisomers themselves. The class II molecules were inherently stiffer than their class I cousins due to the increased (planar) area of the molecule. Consequently, ΔE exhibited significantly less variation between templates with these molecules, as comparison of the trends for the similar 1a/template and 2a/template systems in Table 1 shows. In the former, the magnitude of the stored energy per molecule, the volumetric energy density, and the gravimetric energy density all decrease in the order CNT—pentacene—alkene chain, while in the latter, the energy densities show the opposite trend, alkene chain—pentacene —CNT, despite the small decrease in ΔE for the pentacene and alkene chain templates.

Other embodiments are within the scope of the following claims.

What is claimed is:
1. An energy storage device comprising a solar thermal fuel including closepacked arrays of photoswitchable moieties associated with a nanomaterial that tethers one end of each of the photoswitchable moieties to the nanomaterial, wherein the photoswitchable moieties store energy of the device with enhanced thermal stability, the closepacked arrays of photoswitchable moieties covalently attached and aligned parallel to the long axis of a nanomaterial and arranged in a repeating pattern, the pattern selected so as to produce interactions between adjacent photoswitchable moieties such that when illuminated, the photoswitchable moieties are converted to an energy-storing form wherein the photoswitchable moiety includes a plurality of substituted diazobenzene moieties, wherein the plurality of substituted diazobenzene moieties have formula (I):

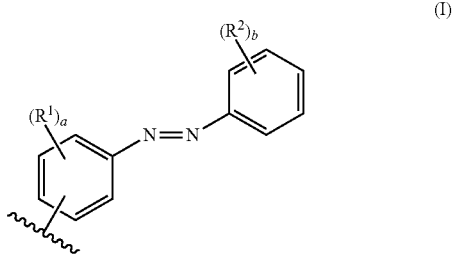

(I)

wherein:
each $R^1$, independently, is H, halo, hydroxy, nitro, cyano, amino, alkylamino, dialkylamino, —$SO_3H$, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)— cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;
each $R^2$, independently, is H, halo, hydroxy, nitro, cyano, amino, alkylamino, dialkylamino, —$SO_3H$, alkyl, alkenyl, cycloalkyl, cycloalkenyl, alkoxy, cycloalkoxy, heterocyclyl, aryl, heteroaryl, heterocyclylalkyl, aryl alkyl, heteroaryl alkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

a is 0, 1, 2, 3 or 4;

b is 0, 1, 2, 3, 4, or 5; wherein at least one of a orb is 0 and at least one of $R_1$ or $R_2$ is not H, and ╎— represents an optional covalent link to the nanomaterial, wherein the nanomaterial includes a polyaromatic hydrocarbon, a graphite, a graphene, a conjugated alkene chain, a fullerene, or a carbon nanotube.

2. The energy storage device of claim 1, wherein the photoswitchable moieties are covalently linked to the template.

3. The energy storage device of claim 1, wherein the carbon nanotube is a single walled carbon nanotube.

4. An energy storage device comprising a solar thermal fuel including a plurality of diazobenzene moieties covalently linked at one end to a carbon nanomaterial via covalent bonds, wherein the photoswitchable moieties store energy of the device, wherein the plurality of substituted diazobenzene moieties are arranged in a repeating pattern on the carbon nanomaterial, wherein the plurality of substituted diazobenzene moieties have formula (I):

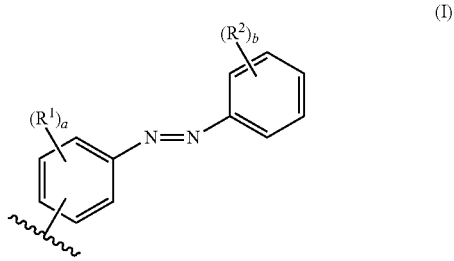

(I)

wherein:

each $R^1$, independently, is H, halo, hydroxy, nitro, cyano, amino, alkylamino, dialkylamino, —$SO_3H$, alkyl, alkenyl, cycloalkyl, cycloalkenyl, alkoxy, cycloalkoxy, heterocyclyl, aryl, heteroaryl, heterocyclyl alkyl, arylalkyl, heteroaryl alkyl, —C(O)-alkyl, —C(O)-alkenyl, —C(O)— cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

each $R^2$, independently, is H, halo, hydroxy, nitro, cyano, amino, alkylamino, dialkylamino, —$SO_3H$, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)— cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

a is 0, 1, 2, 3 or 4;

b is 0, 1, 2, 3, 4, or 5; wherein at least one of a orb is 0 and at least one of $R_1$ or $R_2$ is not H, and ╎— represents an covalent link to the nanomaterial, wherein the nanomaterial includes a polyaromatic hydrocarbon, a graphite, a graphene, a conjugated alkene chain, a fullerene, or a carbon nanotube.

5. A method of storing energy comprising:

providing an energy storage device of claim 1;

illuminating the plurality of photoswitchable moieties, thereby converting the photoswitchable moieties to from a lower-energy state to a higher-energy metastable state;

storing the plurality of photoswitchable moieties in the higher-energy metastable state for a period of time; and providing a trigger to cause the plurality of photoswitchable moieties to revert to the lower-energy state.

6. The method of claim 5, wherein the plurality of photoswitchable moieties are covalently linked to the nanomaterial.

7. The method of claim 5, wherein the carbon nanotube is a single walled carbon nanotube.

8. The energy storage device of claim 1, wherein the template is a polyaromatic hydrocarbon.

* * * * *